(12) United States Patent
Hogg et al.

(10) Patent No.: US 6,725,128 B2
(45) Date of Patent: Apr. 20, 2004

(54) SELF-RECONFIGURABLE ROBOT

(75) Inventors: Tad H. Hogg, Palo Alto, CA (US); Arancha Casal, Woodside, CA (US); Jeremy Kubica, Warwick, RI (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/064,288

(22) Filed: Jun. 28, 2002

(65) Prior Publication Data

US 2003/0109958 A1 Jun. 12, 2003

Related U.S. Application Data

(60) Provisional application No. 60/302,279, filed on Jul. 2, 2001.

(51) Int. Cl.[7] ............................................... G06F 19/00
(52) U.S. Cl. ..................... 700/245; 700/95; 700/100; 700/748; 700/249; 700/250; 700/251; 700/262; 318/560; 318/568.11; 701/23; 702/182
(58) Field of Search ........................ 700/95, 100, 245, 700/248, 249, 250, 251, 262; 318/560, 568.11; 702/182; 703/1, 2, 7; 701/23; 708/404, 406; 714/763, 764, 766, 770, 772; 901/1

(56) References Cited

U.S. PATENT DOCUMENTS

| | | | |
|---|---|---|---|
| 6,233,502 B1 * | 5/2001 | Yim ........................... | 700/245 |
| 6,233,503 B1 * | 5/2001 | Yim et al. ................... | 700/245 |
| 6,243,622 B1 * | 6/2001 | Yim et al. ................... | 700/245 |
| 6,459,957 B1 * | 10/2002 | Bennett et al. ............. | 700/245 |
| 6,477,444 B1 * | 11/2002 | Bennett et al. ............. | 700/245 |

OTHER PUBLICATIONS

Castano et al., Mechanical design of a module for reconfigurable robots, 2000, IEEE, pp. 2203–2209.*

Yim et al., PolyBot: a modular reconfigurable robot, 2000, IEEE, pp. 514–520.*

Suh et al., Telecubes: Mechanical design of a module for self–reconfigurable robotics, 2002, IEEE, pp. 4095–4101.*

Shen et al., "Hormones for Self–Reconfigurable Robots", USC Information Science Institute and Computer Science Department, International Conference on Intelligent Robots and Systems, Oct. 2000.

Hristo Bojinov et al., "Emergent Structures in Modular Self–reconfigurable Robots", Xerox Palo Alto Research Center, Palo Alto, CA., Apr. 2000.

\* cited by examiner

Primary Examiner—William A Cuchlinski, Jr.
Assistant Examiner—McDieunel Marc
(74) Attorney, Agent, or Firm—Oliff & Berridge, PLC

(57) ABSTRACT

Methods of operating a robot comprised of a plurality of modules during reconfiguration, rearrangement to provide a support structure and internal manipulation, each module made of a cubic shape with six faces, each face including an arm for expansion and contraction with another module.

12 Claims, 22 Drawing Sheets

FIG. 13
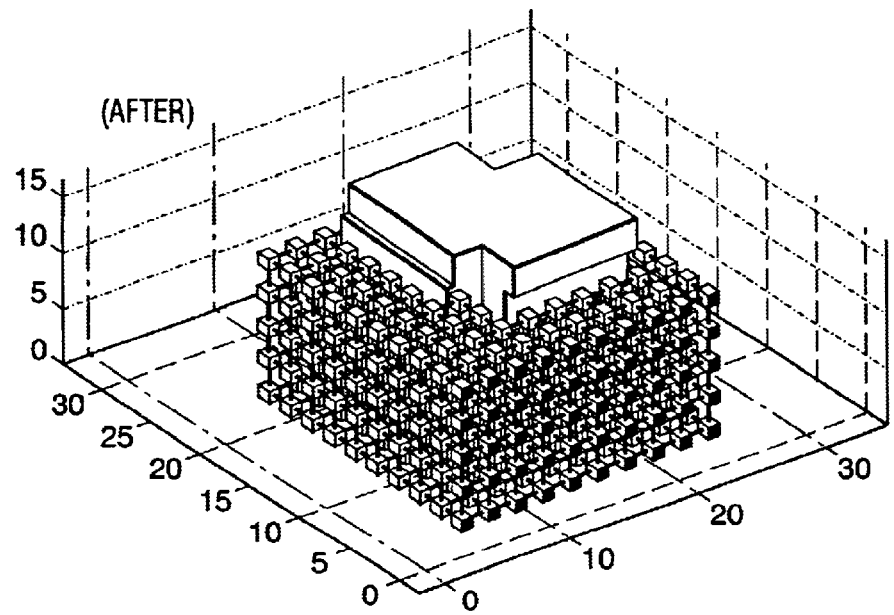
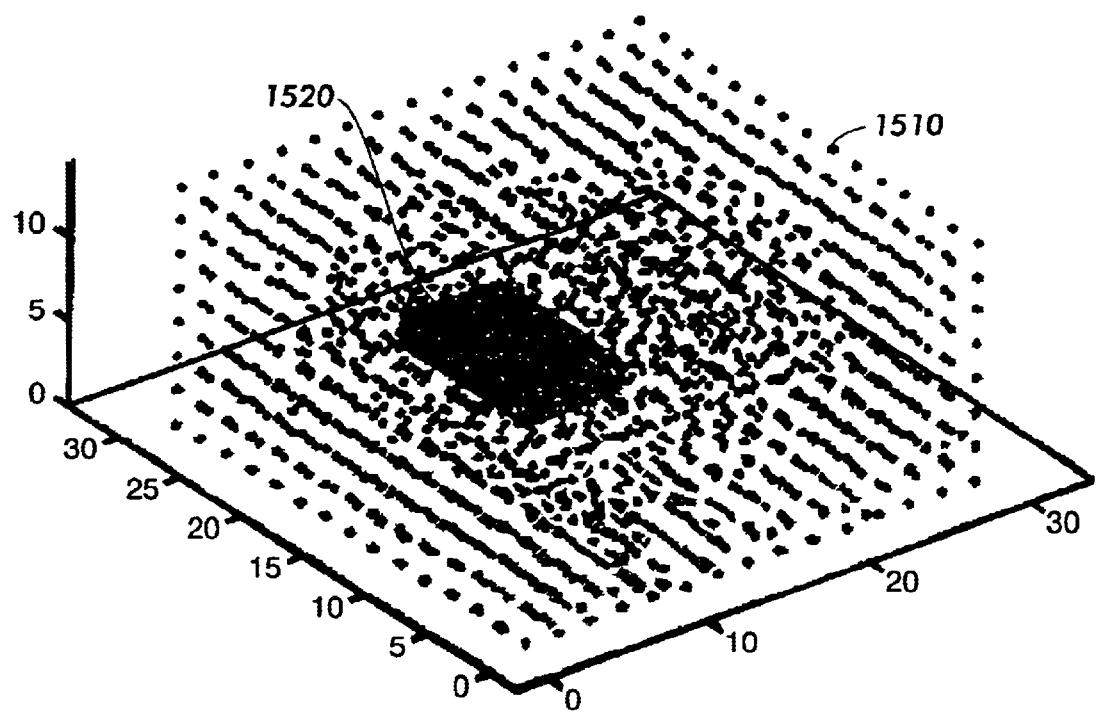
FIG. 14

FIG. 22
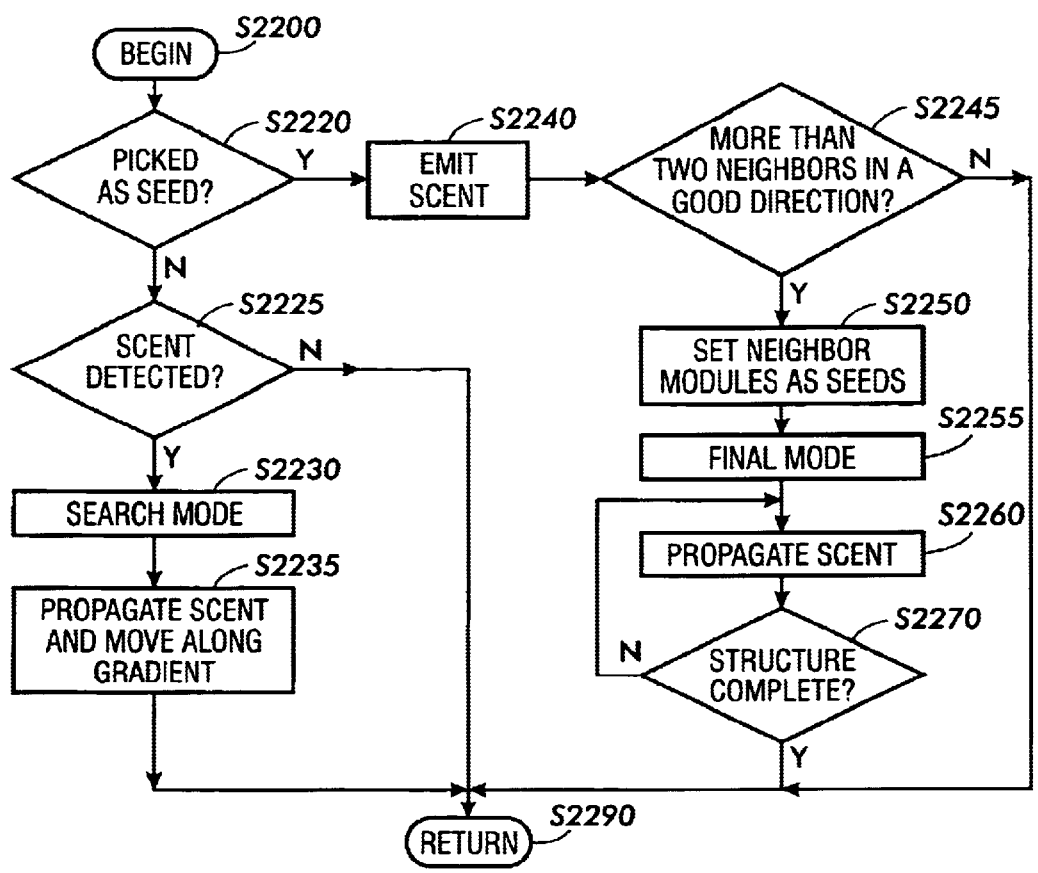
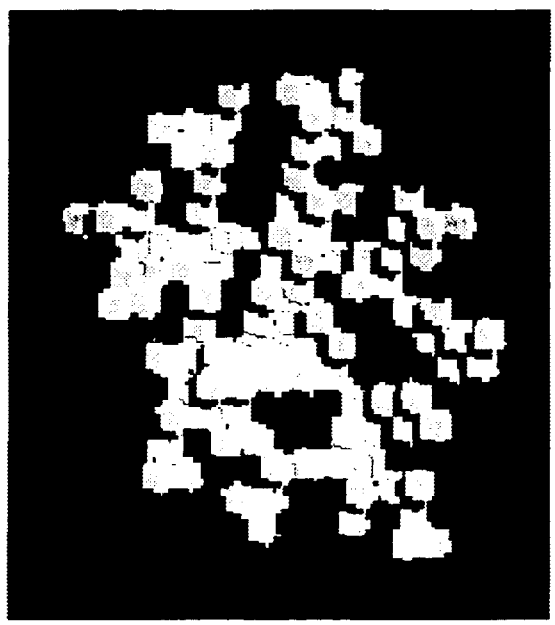
FIG. 23

SELF-RECONFIGURABLE ROBOT

BACKGROUND OF INVENTION

1. Field of Invention

The invention relates to systems and methods for controlling a self-reconfigurable robot.

2. Description of Related Art

Modular self-reconfigurable robots are a relatively new concept. A modular self-reconfigurable robot includes a plurality of identical modules that can attach and detach from one another to change the overall topology of the robot. Each module is a self-contained unit with its own processing, sensing and actuation systems. A modular self-reconfigurable robot can dynamically adapt its shape to suit the needs of the task at hand by manipulating the individual modules to individually move each module to a desired position. Such shapes are unlikely to be as effective for particular tasks as special purpose tools. However, a modular self-reconfigurable robot can respond to a wide range of tasks and unpredictable environments.

As indicated above, each module is identical. Thus, any individual module is no more critical than any other module. If any particular module breaks down, that module can easily be replaced by another module. Furthermore, because the modules are identical, manufacturing costs can be reduced through mass production.

However, modular, self-reconfigurable robots that are formed by a plurality of modules pose several interesting control challenges. Self-reconfiguration, or how to change shape automatically, is a new and thus little-researched problem. Decentralized control is a useful approach to this problem due to the large number of modules in a typical modular, self-reconfigurable robot and because each module is a self-contained unit with its own processing, sensing and actuation. Thus, distributed multi-agent control is particularly relevant.

The problem of self-reconfiguration is unique to metamorphic robots, i.e., robots which can change their shape according to a particular task. Ideally, reconfiguration should occur in a minimum number of steps to reduce the time for reconfiguration and to simplify the structure. Such an optimal solution to reconfiguration involves searching the space of all possible reconfiguration sequences for the optimal reconfiguration sequence. The amount of robot configurations varies according to all of the possible arrangements for a set of connected modules, which grows exponentially with the number of modules. Therefore, for modular, self-reconfigurable robots with hundreds of modules or more, the number of possible reconfigurations thus increases the difficulty in finding the optimal solution.

A number of algorithms can be used to find near-optimal solutions for different modular, self-reconfigurable robot systems. These methods require determining and defining, before reconfiguration, a precise specification of the desired location of all the modules, a desired shape, and an identification of all the motions for the modules according to some criteria, such as minimizing the number of moves or the power consumption. However, in many practical applications, defining an exact target shape may not be suitable or even possible. Thus, such algorithms cannot be used when the nature of the environment or task is uncertain, for example, when grasping an object of unknown size or shape.

SUMMARY OF INVENTION

The invention provides a self-reconfigurable robot with a plurality of modules used to create a structure required to achieve a task.

This invention separately provides a self-reconfigurable robot having a plurality of modules where control of the modules can be expressed largely in terms of the local environment.

This invention separately provides systems and method where, for each module, agent-based control is used to achieve a suitable shape without needing to precisely specify the exact position of each module.

This invention separately provides a self-reconfigurable robot where agent-based architectures are well suited for decomposing control problems based on different physical characteristics at different scales.

This invention separately provides a self-reconfigurable robot where any stable structure that exhibits the desired properties is satisfactory, with no regard for the optimality of the result or for the resulting geometry.

In various exemplary embodiments, the systems and methods according to this invention provides a self-reconfigurable robot which comprises a plurality of modules. Each module is cubic in shape with each of the faces including an arm for expansion and contraction with another module and for communication with the another module.

In various exemplary embodiments, to control the plurality of modules in creating a snake configuration, a module is randomly chosen to emit a first scent along an axis of configuration and a second scent in a direction perpendicular to the axis, wherein the modules along the axis remain along the axis and propagate the second scent in the direction perpendicular to the axis and the other modules are controlled by the second scent to move toward the axis.

In various exemplary embodiments, to control the plurality of modules in creating a support structure, when a module receives a force greater than a predetermined value, the module sends a first scent along an axis, a second scent in a perpendicular direction from the axis, and thereafter forms a rigid support. The other modules then form a rigid support upon receipt of the first scent and propagate the second scent in the direction perpendicular to the axis while modules in receipt of the second scent expand toward the second scent.

In various exemplary embodiments, to internally manipulate an object within a plurality of module, a module in the direction of movement moves toward the module and the modules not in the direction of movement are moved away from the object, wherein the modules are moved into contact with the object and away from the object until the object is at a final location.

These and other features and advantages of this invention are described and are apparent from the detailed description of various exemplary embodiments of the systems and methods according to this invention.

BRIEF DESCRIPTION OF DRAWINGS

Various exemplary embodiments of this invention will be described in detail with reference to the following figures, wherein like numerals represent like elements, and wherein:

FIG. 13 illustrates the modules rearranged according to the operation of FIG. 10;

FIGS. 14 and 15 illustrate an object moved within a plurality of modules during internal manipulation;

FIG. 22 is a flowchart outlining one exemplary operation of a module of FIG. 6 when a plurality of modules are used to create a sponge structure according to this invention;

FIG. 23 illustrates the modules organized into a sponge structure;

DETAILED DESCRIPTION OF EXEMPLARY EMBODIMENTS

Figure 1:
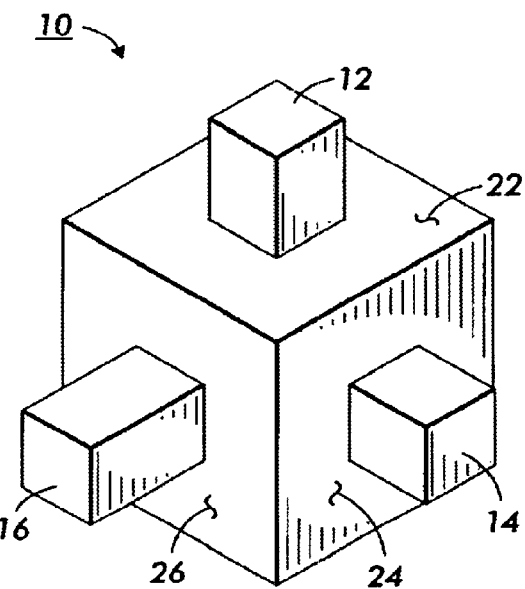
FIG. 1 is a perspective view of a first exemplary embodiment of this invention.

FIG. 1 illustrates an exemplary embodiment of a module 10 according to the invention. The module 10 is a three dimensional cube with an arm 12, 14 and 16 extending from each face 22, 24 and 26 of the module 10. An arm extends as well as from each of the other three faces that cannot be seen. In various exemplary embodiments, each arm 12, 14 and 16 contains a plate. The plate is an attachment member which can be used to either contact the arm 12, 14 and 16 to another arm 12, 14 or 16 with another module 10 or with a surface.

The arms 12, 14 and 16 have two types of movement. That is, the arms 12, 14 and 16 can either contract or expand. To move a module 10, a first arm 12, 14 or 16 of a first module 10 is in contact with a second arm 12, 14 or 16 of a second module 10 or with a surface. Thereafter, the first arm 12, 14 or 16 either expands towards or contracts away from the second module 10 or the surface. Thus, as should be appreciated, the module 10 cannot move under its own power if it is not in contact with another module 10 or with the surface in either the direction of movement or in the opposite direction, because the module 10 must have something to push off of or pull on.

Furthermore, because the module 10 can only move through the expansion and contraction of the arms 12, 14 and 16, the module 10 cannot spin or otherwise change orientation. Thus, as should be appreciated, during the duration of movement of the module 10, the three axes of each of the modules 10 thus remains fixed relative to each other. This further simplifies the movement of each module 10 by providing fixed axes.

Figure 2:
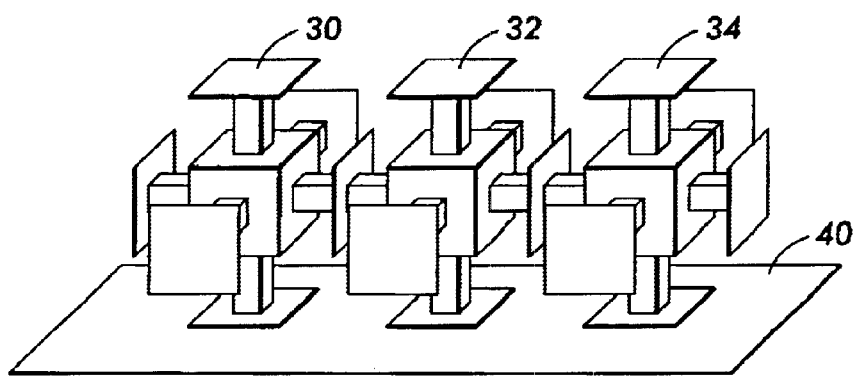
FIGS. 2–5 are perspective views of a group of modules of FIG. 1.
Figure 3:
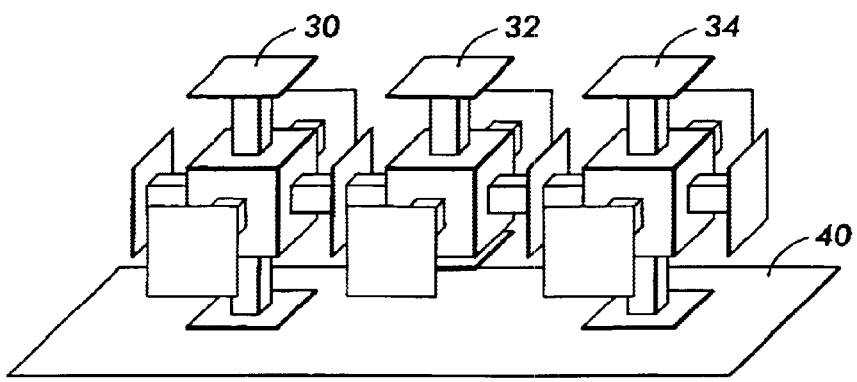
Figure 4:
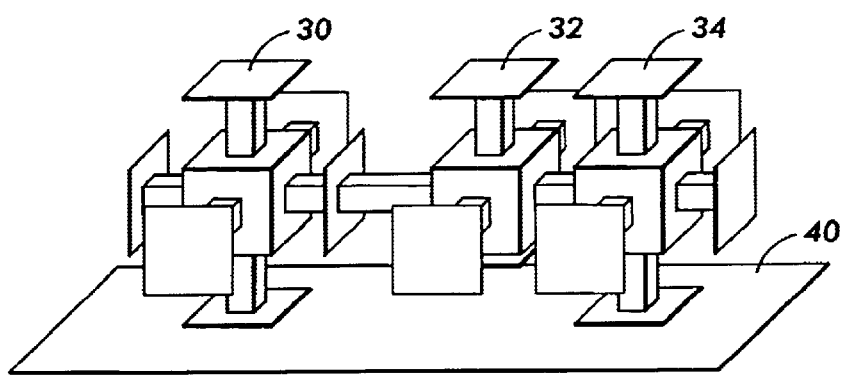
Figure 5:
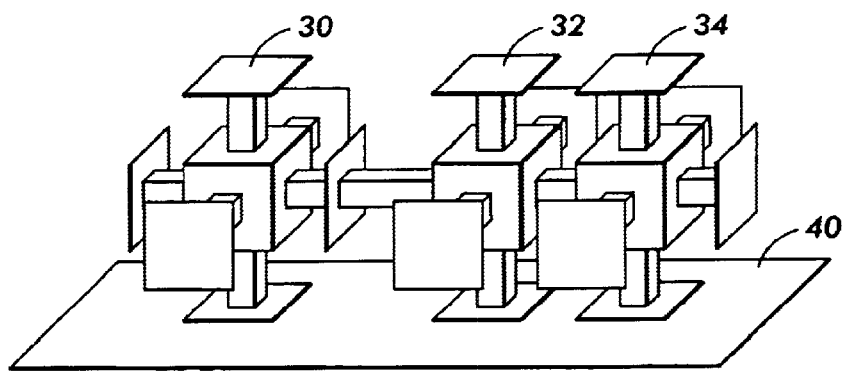

FIGS. 2–5 illustrate the movement of the modules 10 as a first module 32 will move toward a second module 34 and away from a third module 30. As shown in FIG. 2, each of the modules 30, 32 and 34 is initially placed an equal distance from the adjacent module or modules. The first module 32 first disconnects from all neighbor modules and/or surfaces in directions perpendicular to the direction of motion. As shown in FIG. 3, the module 32 moves its lower most arm away from the surface 40. Then, the first module 32 moves relative to the second and third modules 34 and 30 by expanding its back arm and contracting its front arm, where front and back are determined by the direction of motion. As shown in FIG. 4, the first module 32 expands its back arm while the first module 32 contracts its front arm. As should be appreciated, performing the dual expansion and contraction thus has the advantage of allowing the first module 32 to effectively slide forward on its front and back arms instead of pushing or pulling large chains 32 of the modules 10. Finally, the first module 32 then connects to a module and/or surface to which it is now aligned. As shown in FIG. 5, the first module 32 expands its lowermost arm to again contact with the surface 40.

An exception to this process can occur, where prior to a move, a neighboring module is only connected to a module undergoing a move. In this case, the module undergoing the move can that drag that neighboring module along in the direction of movement.

The internal control for each module 10 is implemented using a finite state machine. The movement of each module 10 is based on the module's sensors, internal state and internal data of that module. Thus, the position of any particular module 10 dictates what actions that module 10 should be performing. In various exemplary embodiments, each arm 12, 14 and 16 of each module 10 has the same sensor. The data these sensors collect and relay, can include, for example, arm length, whether that arm is in contact with another module 10 or with a surface, and interaction with another module 10 or surface.

The modules 10 remain in communication with each other through the passing of gradients and scents. Each module 10 is also capable of sending and receiving a message from each of the six faces of the module 10.

A scent is a direct message from one module to a neighboring module. At any given time, a plurality of scents can be emitted by a given module 10 to pass along a plurality of messages. Furthermore, each module 10 maintains, in its memory, a magnitude of the scent received. One type of scent used passes along an assignment from one module 10 to another module 10 to indicate a type of movement any particular module 10 should be performing. Another type of scent used can indicate the distance between the module 10 originally emitting the scent and the module 10 receiving the scent. The magnitude of this type of scent thus indicating the distance between the two modules. Yet another type of scent used can indicate to the module 10 the distance the module 10 has to travel to reach its final location. The magnitude of this type of scent can thus indicate the distance the module 10 needs to travel. However, it should be appreciated that various other scents can be emitted to pass along messages to other modules 10 to control the movement of any individual module 10.

A gradient is a message that is usually propagated to other modules 10 to indicate a direction along which the other modules 10 should be moving. A module 10 may pass gradients to any of the six possible neighbors to which could be connected, to indicate six possible directions to which the neighboring modules 10 could move. Furthermore, gradients can either be positive or negative to indicate a movement toward or away from the module 10 passing the scent.

In addition to passing gradients and scents, the modules 10 can also exchange a limited amount of internal information. This is done through direct queries and is used to retrieve such information as module state and arm length in the direction of the inquiring modules. Finally, the modules 10 can also pass forcible move messages. Forcible move messages require the receiving module 10 to move, if possible. Thus, when a forcible move message is sent to a neighbor, the neighbor module 10 is moved in the required direction.

As should be appreciated, each module 10 is an independent agent executing a simple program. There is no central control processor or designated leader module 10. To move each of the individual modules 10, a plurality of local rules are followed and executed by every module 10. These behaviors are thereafter turned on and off for each of the modules 10 to give overall control for a sequence of tasks.

By using the simple rules, the modules 10 generally avoid being indefinitely stuck in non-productive configurations, and also generally keeps all modules 10 from moving at once, potentially disconnecting the structure or leading to oscillations due to synchronous activity in which all modules 10 respond based on a state of the system that no longer holds if too many of the neighboring modules 10 move simultaneously.

Figure 6:
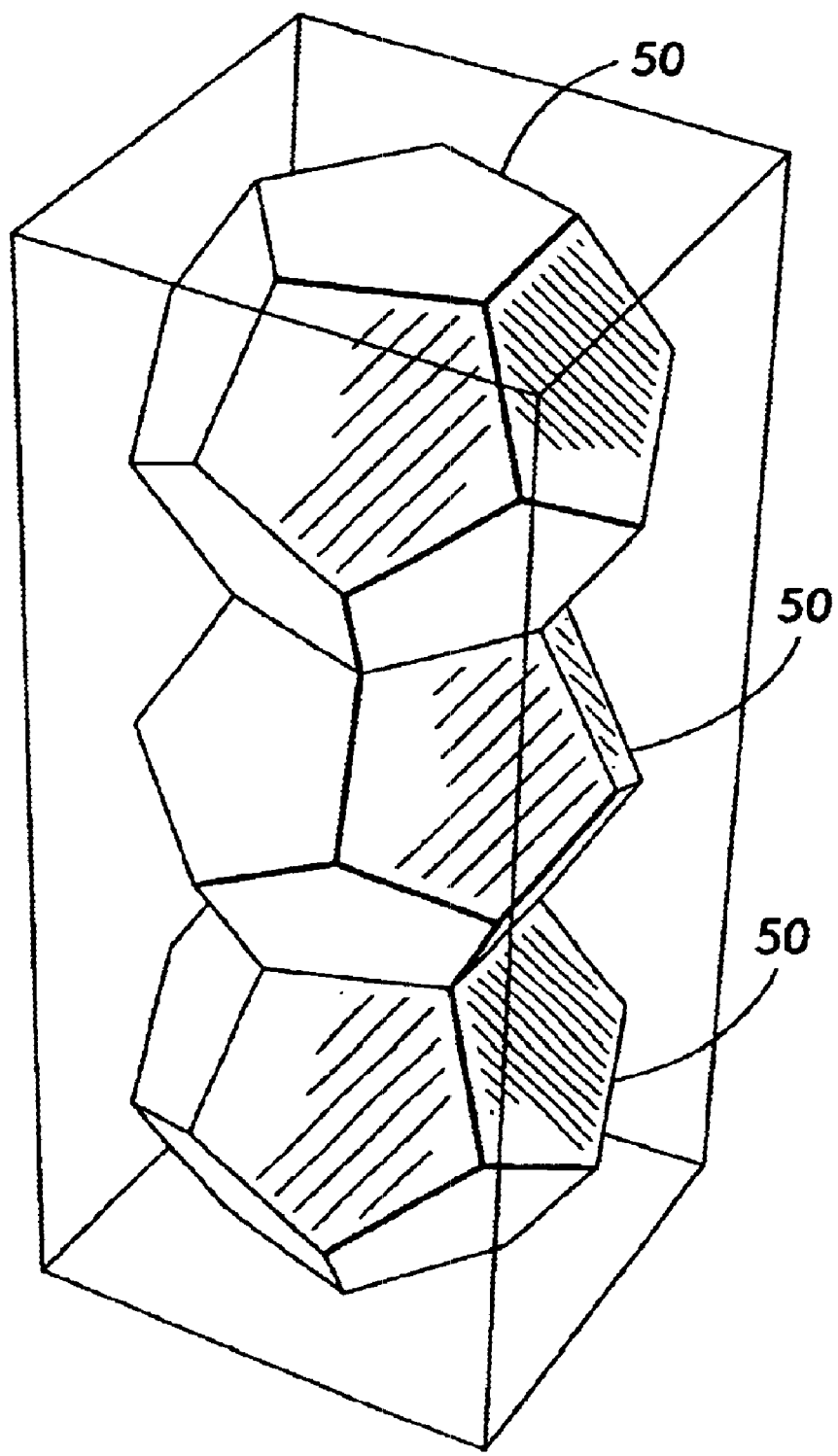
FIG. 6 is a perspective view of a second exemplary embodiment of a module according to this invention.

FIG. 6 illustrates a second exemplary embodiment of a module 50 according to this invention. As should be appreciated, the module is of a regular dodecahedron (a polyhedron with twelve face, each of which is a pentagon). During movement, each module rotates onto an adjacent face of another module.

Figure 7:
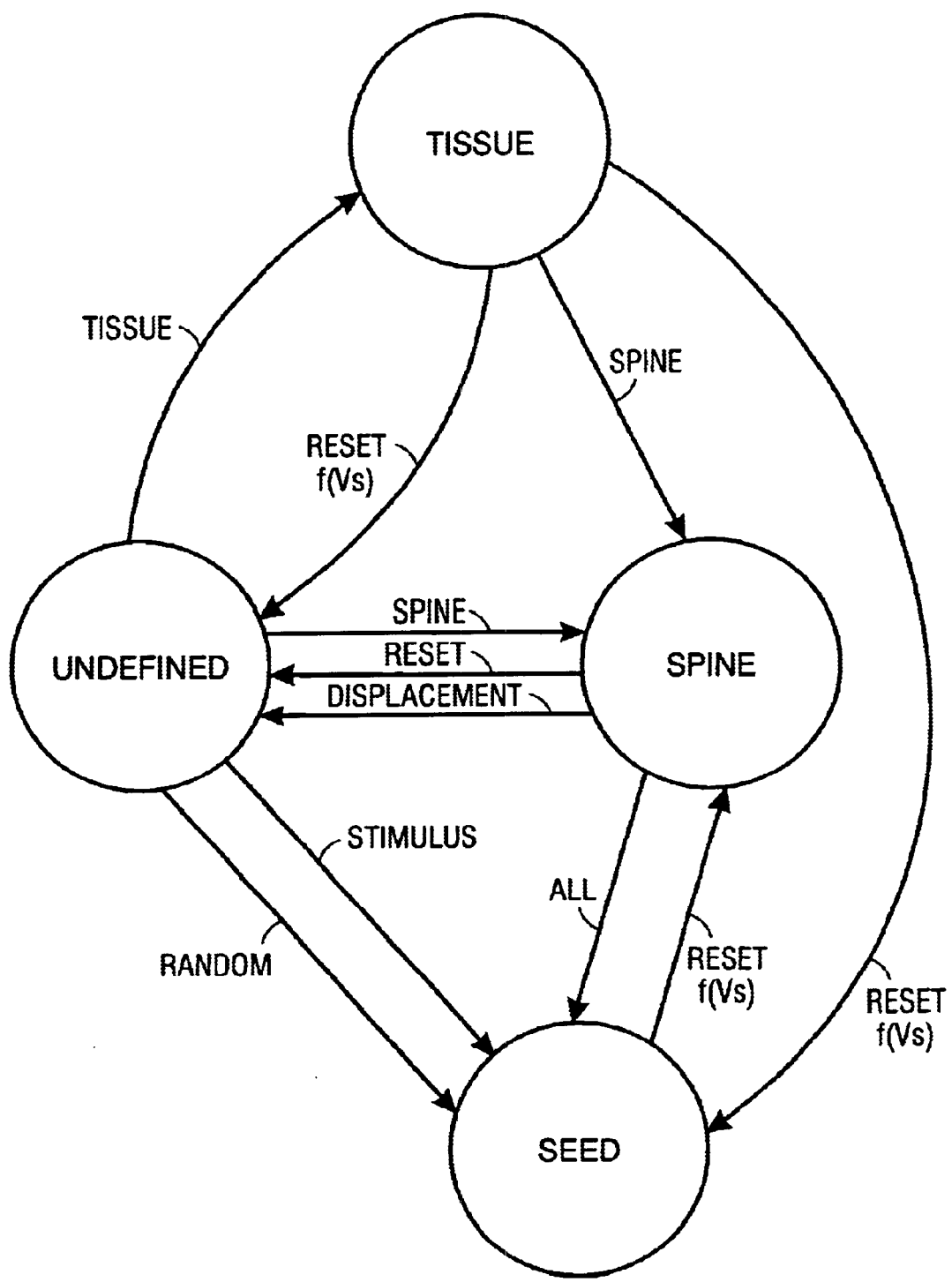
FIG. 7 is a flowchart outlining one exemplary operation of a module of FIG. 1 when a plurality of modules are used to create a snake configuration according to this invention.
Figure 8:
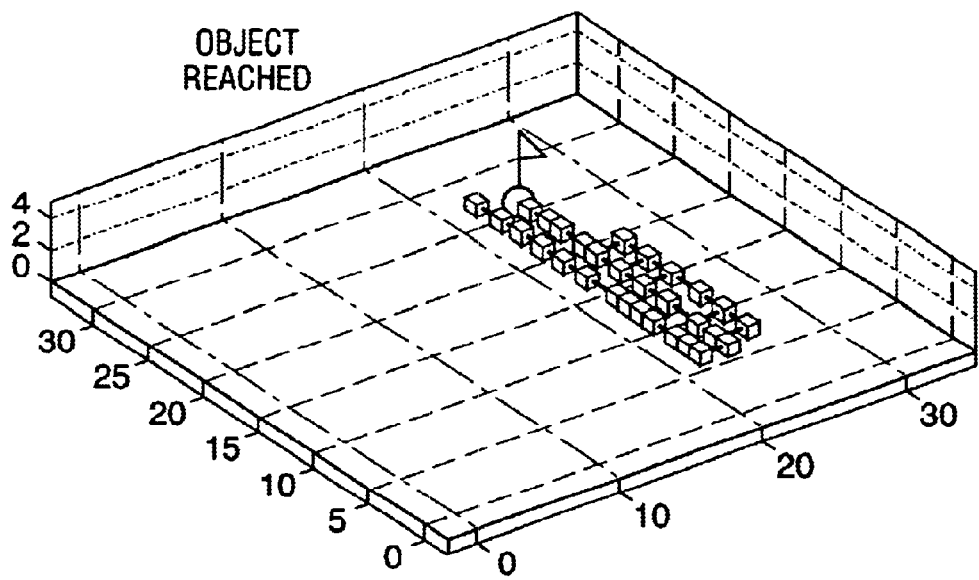
FIG. 8 illustrates a plurality of modules reaching an object.
Figure 9:
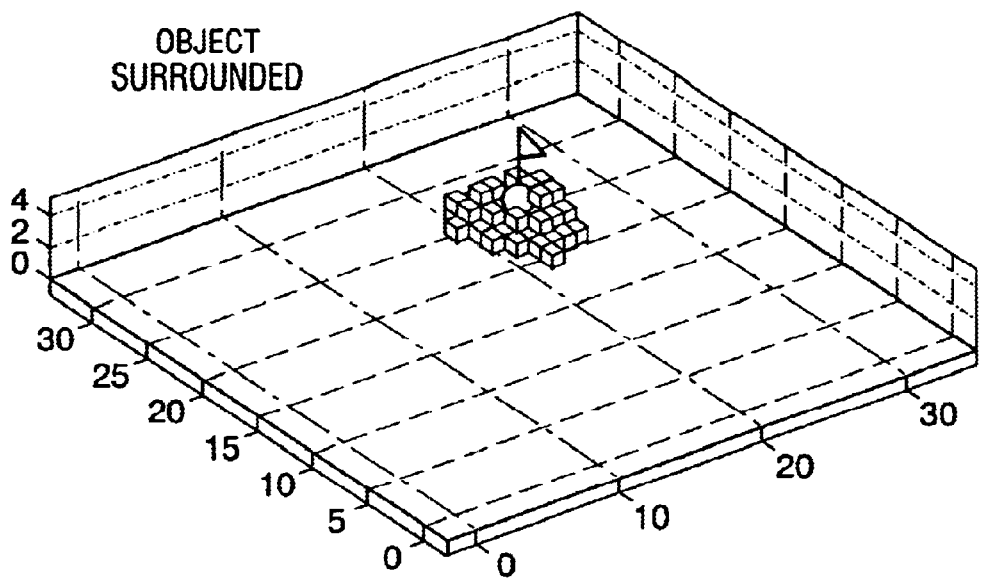
FIG. 9 illustrates a plurality of modules surrounding an object.

FIGS. 7–9 describe the movements of the modules of FIG. 1 for various particular tasks. As discussed above, each module follows a few simple rules. However, it should be appreciated that any other type of module, including the modules 50 of FIG. 6 can use the following rules.

For simplicity, a particular order in which the modules 10 or 50 follow the rules will be described. However, it should be appreciated that the modules can choose any particular order to follow the rules.

Furthermore, when performing a task, each module 10 or 50 will be described as operating in a particular mode. Each mode determines the behavior of the module 10 or 50 and the scents to be emitted to other neighboring modules 10 or 50. To determine which mode a module will be operating in, the module receives an assignment from another module. The assignment is a scent passed from one module 10 or 50 to another module 10 or 50 to transition the receiving module 10 or 50 to a particular mode. A module 10 or 50 can also transition to another mode after completing a particular task. In that case, once a module 10 or 50 performs the particular task, that module 10 or 50 automatically transitions to another mode.

FIG. 7 is a block diagram outlining one exemplary embodiment of a method for a finite state machine used by a module in a reconfiguration mode. In particular, the finite state machine shown in FIG. 7 is particularly useful to reconfigure the modules into a snake configuration. The snake configuration is not a set assignment of module positions, but rather a configuration of the modules having a given width. For the snake configuration, the gradient is similar to a magnetic attraction. A module within the interior of the snake configuration will be in a spine mode. In the spine mode, that module emits a scent outward to the other modules around it. This scent, which carries information about the distance from the originating module in the spine mode, prompts other modules to attempt to move within a given threshold distance of the originating module in the spine mode.

As shown in FIG. 7, the reconfiguration mode into the snake configuration is handled via four modes, i.e., an undefined mode, a tissue mode, a seed mode and a spine mode, and using seven scents, i.e., on a mode assignment scent, a reset scent, a spine direction scent, a tissue scent, an object scent, a suggested move scent and a distance from the spine scent.

At the beginning of each module's turn, each module receives and handles incoming scents. Any module in a given mode may transition to a higher-ranked mode upon receiving the mode assignment scent, where the modes are ranked in ascending order as: undefined, tissue, seed and spine. In addition to storing the mode, a module also tracks such information as the direction the spine extends along, the distance from that module to the nearest spine module, and keeps an internal energy count. Reset scents cause modules to enter either the undefined mode or the seed mode, depending on the value of the reset scent Vs, i.e., as a function f(Vs) where Vs is the value of the reset scent.

The module in the seed mode serves as the catalyst for all action in the collection of other modules. An undefined module or a tissue module can transition to become a seed mode by being randomly chosen to be in the seed mode, by receiving an seed assignment scent, by receiving an optionally generated stimulus from an adjacent module, or in response to a direct transition to the seed mode in response to receiving a reset scent based on the strength of the reset scent and the internal energy count.

When a module starts a turn in the seed mode, that module sets up the spine. That module, called a seed module does this by releasing appropriate assignment scents to its neighbors and then transitioning to the spine mode. Namely, the seed module sends a spine assignment scent impulse along the directions of the new spine and a tissue assignment scent in all other directions. If the seed module is not in what that module considers a good location rather than transitioning to the spine mode and setting up the spine, that seed module passes a seed scent to a neighbor module. That seed module then transitions to the undefined mode.

A module transitions to the spine mode i.e., becomes a spine module, either by receiving a spine assignment scent from an adjacent module, by moving within a distance threshold of the spine in a direction perpendicular to the spine direction, or automatically upon leaving the seed mode. A spine module sends out relevant information to its neighbors. This information includes appropriate assignment scents, the information identifying the spine direction, and information regarding a gradient that serves to give to a receiving module information regarding the distance from and the direction towards the spine.

The module also tries to maintain a desired linear density with respect to other ones of the spine modules and/or tissue, or seed or undecided modules. Thus, a spine module will move away from a neighboring spine module to which that spine module is too close to, and will move towards a neighboring spine module that is too far away from that spine module. When moving due to a density problem, a spine module will pass a suggested move scent to a neighboring module immediately prior to that spine module moving, so that the neighboring modules may also move and remain connected. If the neighboring modules can move, they will respond to the received suggested move scent at the start of their next turn.

An undefined module transitions to the tissue mode upon receiving a tissue scent. Each module in the tissue mode begins its turn by sending relevant information to the neighboring modules. This relevant information includes all assignment and spine information scents that that tissue module has received, as well as outputting a tissue scent if that tissue module (i.e., the transmitting tissue module) is farther than the distance threshold from a spine module, and outputting an object scent if that module (i.e., the transmitting tissue module) is touching an object. If that tissue module is farther than the distance threshold from a spine module, that tissue module will try to join the line below it with a given probability. In various exemplary embodiments, this probability is 20%. This is used to bias against two neighboring modules both trying to join the same line at the same time. However, it should be appreciated that any probability can be chosen.

As with spine modules, a tissue module attempts to maintain a desired linear density between that tissue module and the neighboring modules. However, unlike the spine modules, tissue modules do not pass suggested move scents when they move to adjust the actual linear density.

A module remains in the reconfiguration mode until that module no longer receives new tissue assignment scents. The tissue assignment scent, which is repeatedly emitted by a module that is in the spine mode, is propagated between all neighboring modules that are in the tissue mode, but decays rapidly. Thus, the tissue assignment scent effectively acts as a test to determine if the configuration has been reached in a local region around each module.

Once the desired configuration, such as the snake configuration, has been reached in a local region around a particular module, that module leaves the reconfiguration mode and enters a locomotion mode or a movement mode. In various exemplary embodiments, the locomotion or movement mode can begin similar to the example shown in FIGS. 2–5.

Locomotion along the spine direction of a module in the spine mode is accomplished by using a movement scent. The foremost module (i.e., the module that is in front of the other modules relative to the direction of movement) in the local region that is in the spine mode acts as a leader for the modules in the local region. The foremost module initiates the movement by sending a movement scent to all of its neighboring modules. When a module receives a movement scent, that module will move, if possible. That module will also send the movement scent to all of its neighboring modules. After a particular module responds to a movement scent received from an adjacent or neighboring module, that module will then wait a set number of intervals or before that module responds to another movement scent.

Turning is also controlled by the foremost spine module of the local region that is in the locomotion mode. To execute a turn, the foremost spine module issues a reset scent to reset the modules receiving the reset scent to the undefined mode of the reconfiguration mode, this and restarting the FIG. 7 with a new spine direction pointing in a new direction. The foremost spine module that sent out the reset scent determines the location in a new seed scent transmitted to another module. Once the reconfiguration is complete in a local region, the modules in that local region reenter the locomotion configuration and resume moving in the new direction.

In other exemplary embodiments, the locomotion mode can also be used to reach objects, as shown in FIG. 8. To reach an object, the foremost spine module in the spine mode is either given the location of the object or can determine the location of the object the use of an object sensor. The foremost spine module then determines whether to use locomotion to reach the object or whether to send a new seed scent to create a new snake configuration pointed toward the object.

Once the modules reach the object, the modules can either push the object or surround the object. To push the object in a desired direction, the modules can approach the object at an appropriate location using locomotion. The modules can then repeatedly run into and push the object in the desired direction.

To surround the object, as shown in FIG. 9, the modules first come into contact with the object using the locomotion mode. Once a first module initially contacts the object, the modules will generally follow three rules to surround the object. If a module is touching the object, the module does not move but emits a positive object gradient. If a module is not touching an object, the module moves in the direction toward the object along the positive object gradient. Finally, if a module is not touching the object and that module cannot move along the positive object gradient toward the object because another module in the way of that object, that module moves in a random direction at a 10% probability. That is, if that module is blocked as described above, there is a 90% probability that module will do nothing for the rest of this movement opportunity, and a 10% probability that module will move in a random direction. Of course, if that module cannot move in the randomly selected direction for any reason, the random probability process is reaped until the module determines that it will do nothing (i.e., the 90% probability case) or it can move in the randomly selected direction. The random direction allows the modules to spread out. This rule is biased away from the modules being allowed to move so that only a small percentage of the modules move randomly in any given turn.

In other various exemplary embodiments, the modules can also be used as a supporting structure for supporting an object. Each arm of the module has a pressure sensor. When the pressure sensor of an individual module, when supporting an object, is beyond a predetermined value, that module can release scents that cause additional modules to grow toward the object to reduce the pressure on that module and provide a more uniform support for the object.

Figure 10:
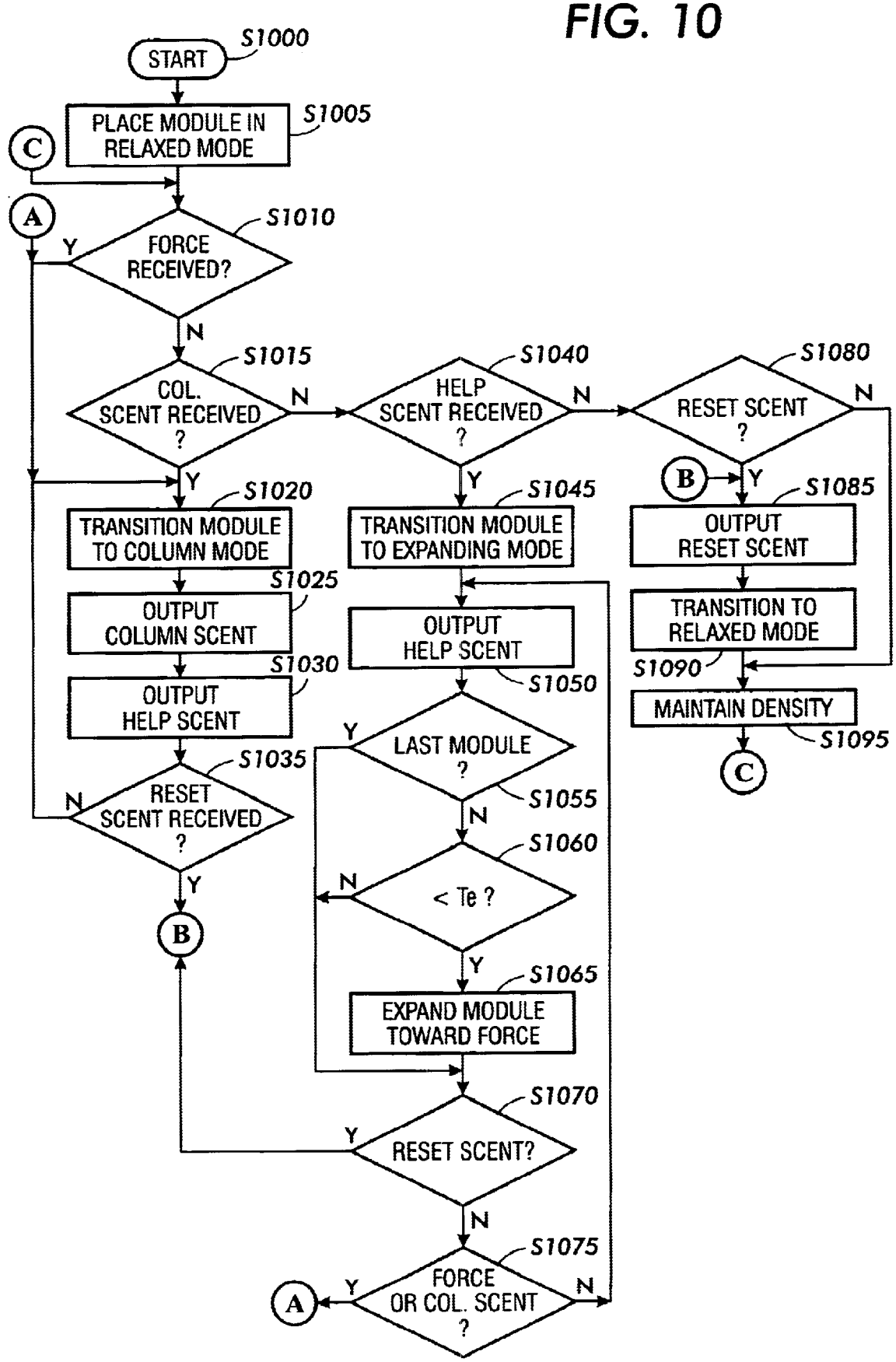
FIG. 10 is a flowchart outlining one exemplary operation of a module of FIG. 1 when a plurality of modules are used to support an object according to this invention.

FIG. 10 is a flowchart outlining one exemplary embodiment of an operation of a module when a plurality of modules are used to support an object. In operating the modules, a force is applied to at least one module which is greater than a predetermined value. This causes the modular self-reconfigurable robot to create additional supports for the object.

In this case, each arm or face of the module 10 or 50 is provided with a sensor that is able to sense a force or pressure applied to that arm or face. The sensors are able to provide a force or pressure stimulus or signal to the module.

For a module in an object support mode, operation to support an object applying a force against that module, starts in step S1000 and proceeds to step S1005 where each module initially begins in the relaxed mode. In step S1010, a determination is made whether the module has received a force beyond a predetermined value. If the module has not received a force beyond a predetermined force, the operation proceeds to step S1015. Otherwise, the operation proceeds to step S1020.

In step S1015, a determination is made whether the module has received a column scent. If the module has received a column scent, the operation proceeds to step S1020. Otherwise the operation proceeds to step S1040.

In step S1020, the module transitions to the column mode. While in the column mode, the module acts as a rigid support structure where the arms neither expand nor contract. Then, in step S1025, the module outputs column scents in the direction parallel to the applied force. Then, in step S1030, the module outputs a help scent in the direction perpendicular to the direction of the applied force.

In step S1035, a determination is made whether the module has received a reset scent. If the module has received a reset scent, the operation proceeds to step S1085. Otherwise, the operation returns to step S1020.

In step S1040, a determination is made whether the module has received a help scent. If the module has received a help scent, the operation proceeds to step S1045. Otherwise, the operation proceeds to step S1080. In step S1045, the module transitions to the expanding mode. Then, in step S1050, the module outputs a help scent to other modules in the expanding mode.

In step S1055, a determination is made whether the module is the last module. The module is the last module if it is the last module located along a column of modules. If the module is not the last module, the operation proceeds to step S1060. Otherwise, the operation proceeds to step S1070.

In step S1060, a determination is made whether the module can expand toward the direction that the stimulus was received with a predetermined probability. In various exemplary embodiments, the predetermined probability is 50%. If the module can not expand below the predetermined probability, the operation proceeds to step S1070. Otherwise, the operation proceeds to step S1065. In step S1065, the module expands towards the direction that the stimulus was received.

In step S1070, a determination is made whether the module has received a reset scent. If the module has not received a reset scent, the operation proceeds to step S1075. Otherwise the operation proceeds to step S1075. In step S1076, a determination is then made whether the module has received a force beyond a predetermined value or a column scent. If the module has received the force or the column scent, the operation returns to step S1020. Otherwise the operation returns to step S1050.

In step S1080, a determination is made whether the module has received a reset scent. If the module has received the reset scent, the operation proceeds to step S1085. Otherwise the operation proceeds to step S1095. In step S1085, the module outputs the reset scent. Then, in step S1090, the module transitions to the relaxed mode. In step S1095, the module then maintains an optimal density with the other modules in the relaxed mode. Thereafter, the operation returns to step S1010.

Figure 11:
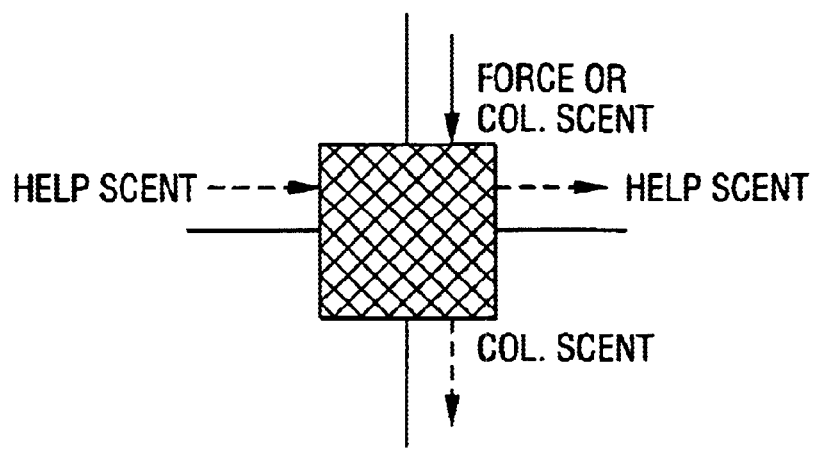
FIG. 11 illustrates the force applied and scents emitted by a module in the column mode.

FIG. 11 illustrates a module in the column mode. As shown in FIG. 11, the module has either received a force beyond a predetermined value or a column scent. The module then outputs a column scent in the direction parallel to the force or column scent and a help scent in the direction perpendicular to the force or column scent.

Figure 12:
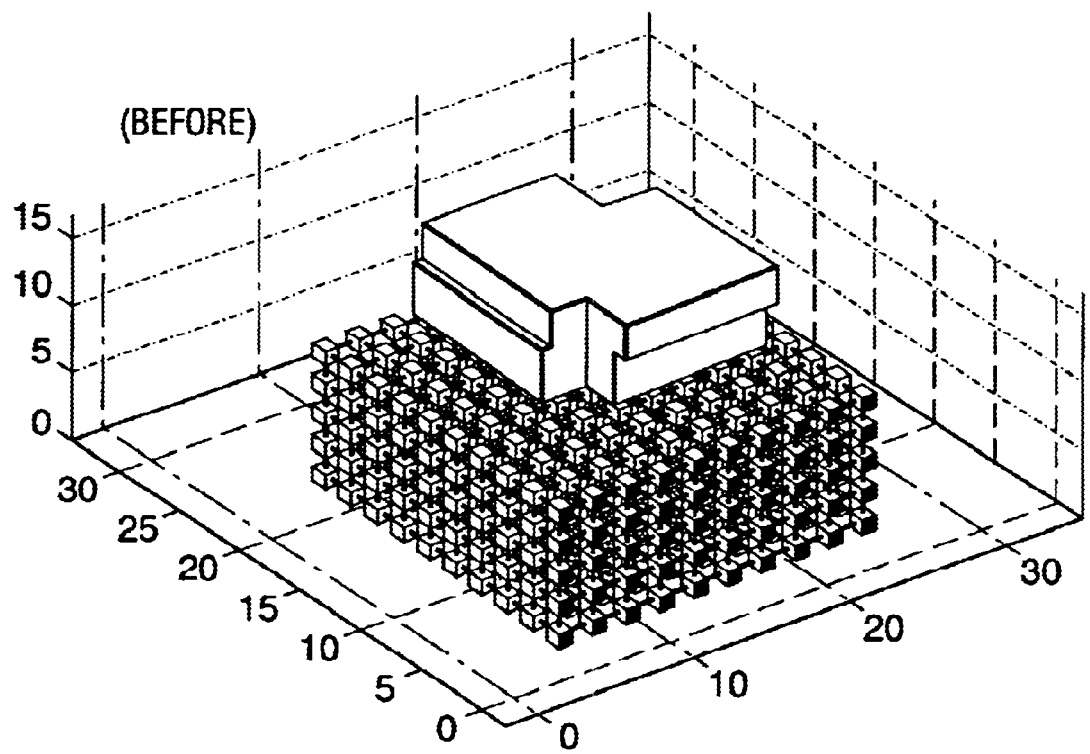
FIG. 12 illustrates an object initially placed on a plurality of modules.

FIG. 12 illustrates the modules during reconfiguration when an object has been initially placed on a plurality of modules and FIG. 13 illustrates the modules after reconfiguration. As should appreciated from FIG. 13, the modules have expanding toward the object to distribute the applied force to more modules than FIG. 12.

Figure 15:
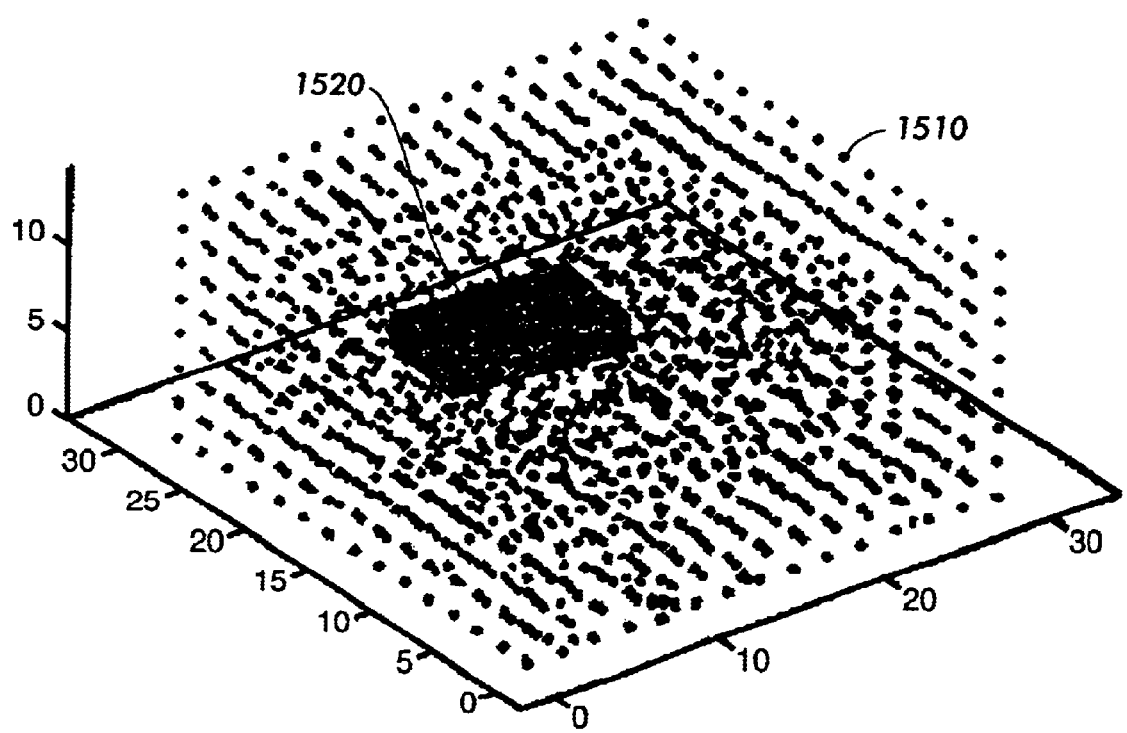

In other exemplary embodiments, as shown in FIGS. 14 and 15, the modules can also be used to internally manipulate an object located within a plurality of modules. As shown in FIGS. 14 and 15, a plurality of modules combine together to form a structure 1510 which surrounds an object 1520. To remove the object 1520 within the structure 1510, gaps in the direction of movement are first created within the structure 1520 by moving modules away from the object 1520. Thereafter, modules, on the other side of the gap, push the object 1520 into the gap. By continuously making new gaps and pushing the object 1520, the object 1520 can be manipulated within the structure 1510.

Internal manipulation can occur according to two motions, translational and rotational motions. In both cases, if a module is not in direct contact with an object, movement is based on the gradient the module receives from neighboring modules. Namely, if possible, a module will move in the direction of the positive gradient. If the module is not receiving any gradient, it will try to move in such a way as to restore an optimal density within the plurality of modules. Thus, the modules will move away from a neighbor if it is too close or farther from the neighboring module if it is too far away.

Figure 16:
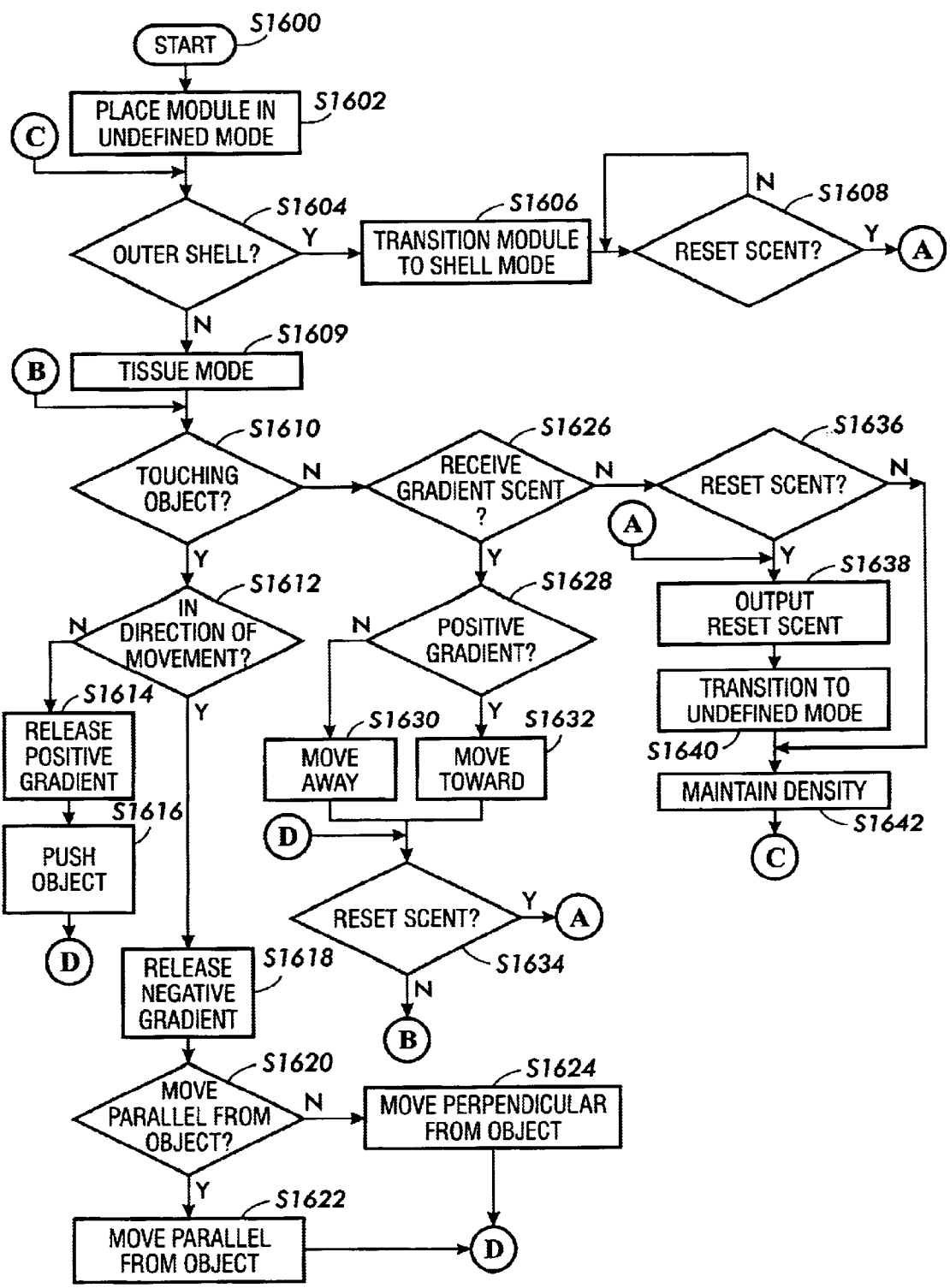
FIG. 16 is a flowchart outlining one exemplary operation of a module of FIG. 1 when a plurality of modules are used to internally manipulate an object according to this invention.

FIG. 16 is a flowchart outlining one exemplary embodiment of an operation of a module during internal manipulation. The operation starts at step S1600 and proceeds to step S1602 where each module initially begins in the undefined mode.

In step S1604 a determination is made whether the module is part of the outer shell. A module is a part of the outer shell if one of the faces of the module is not in contact with another module or surface. If a module is a part of the outer shell, the operation proceeds to step S1606. Otherwise the operation proceeds to step S1609. In step S1606, the module transitions to the shell mode where the arms neither expand nor contract. In step S1608, a determination is made whether the module has received a reset scent. If the module has received the reset scent, operation proceeds to step S1638. Otherwise, the operation returns to step S1608.

In step S1609, the module transitions to the tissue mode. In step S1610, a determination is made whether the module is touching an object. If the module is touching an object, the operation proceeds to step to step S1612. Otherwise, the operation proceeds to step S1626. In step S1612, a determination is then made whether the module is in the direction of movement (i.e. in front of the object). If the module is not in the direction or movement, the operation proceeds to step S1614. Otherwise, the operation proceeds to step S1618.

In step S1614, the module releases a positive gradient to attract other modules. Then, in step S1616, the module pushes the object by expanding toward the object.

Conversely, in step S1618, the module releases a negative gradient to move other modules away from the object. In step S1620, a determination is made whether the module can move in a direction parallel to the direction of movement for the object. If the module can move in the parallel direction, operation proceeds to step S16622 where the module moves parallel to the direction of movement of the object. Otherwise, the operation proceeds to step S1624 where the module moves in a perpendicular direction to the direction of movement of the object.

In step S1626, a determination is made whether the module is receiving a gradient scent. If the module is receiving a gradient scent, the operation proceeds to step S1628. Otherwise, the operations proceeds to step S1636.

In step S1628, a determination is then made whether the module is receiving a positive gradient. If the module is not receiving a positive gradient, control proceeds to step S1630 where the module moves away from the received gradient. Otherwise, the operation proceeds to step S1632 where the module moves toward the received gradient.

In step S1634, a determination is made whether the module has received a reset scent. If the module has not received a reset scent, the operation returns to step S1610. Otherwise, the operation proceeds to step S1638.

In step S1636, a determination is made whether the module has received a reset scent. If the module has received a reset scent, the operation proceeds to S1638. Otherwise the operation proceeds to step S1642.

In step S1638, the module outputs the received reset scent. Then, in step S1640, the module transitions to the undefined mode. In step S1642, the module then maintains an optimal density with the other modules. The operation then returns to step S1604.

Figure 17:
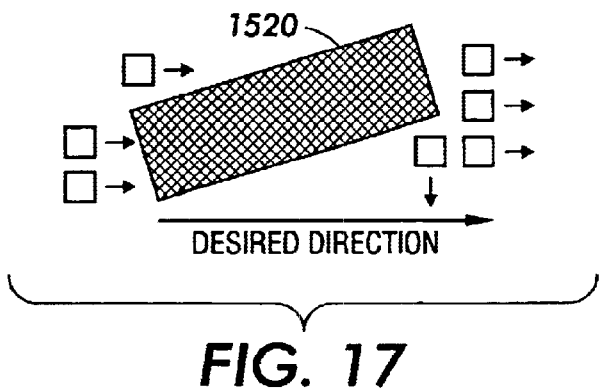
FIG. 17 illustrates the modules during rotational movement.

To perform rotational motion as shown in FIG. 17, a global knowledge of the approximate center of the object 1520 is given to the modules. Using this, the modules respond the same way as the translation modules, except that they move away from the object 1520 if they are in front of a corner that will be turning towards them and towards the object 1520 if they are in front of a corner that will be moving away from them. Again, they release positive and negative gradients for moving towards and away from the object 1520, respectively, and push the object 1520 when they move towards it.

FIGS. 18–34 will hereinafter be used to describe the movement of the modules of FIG. 6 for various particular tasks. However, it should be appreciated that any other type of module, including the module of FIG. 1 can be used for the following rules. For simplicity, a particular order in which the modules follow the rules will be described. However, it should be appreciated that the modules can choose any particular order to follow the rules.

Figure 18:
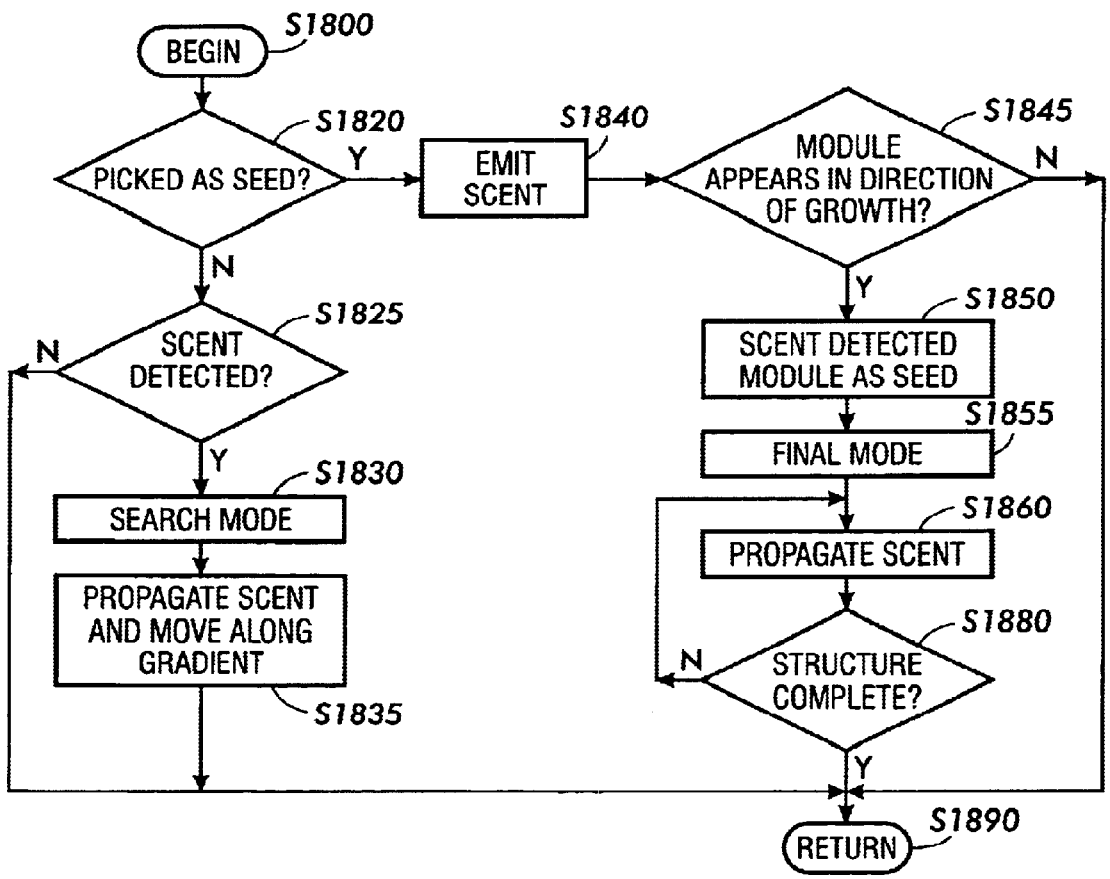
FIG. 18 is a flowchart outlining one exemplary operation of a module of FIG. 6 when a plurality of modules are used to create a chain structure according to this invention.
Figure 19:
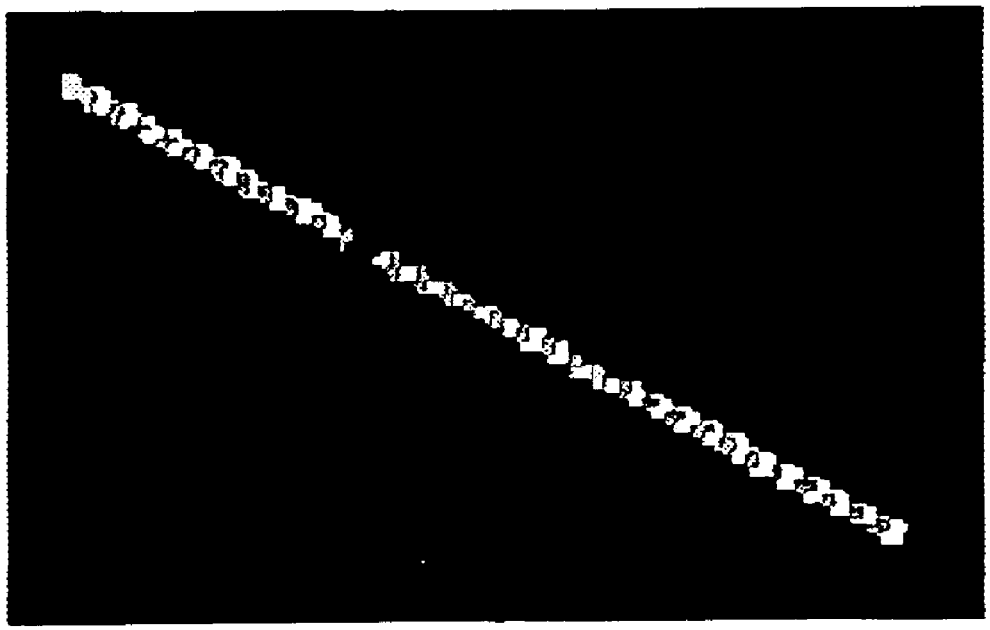
FIG. 19 illustrates the modules organized into a chain structure.

FIG. 18 is a flowchart aligning one exemplary embodiment of a method creating a chain structure and FIG. 19 illustrates the chain structure. In various exemplary embodiments, the chain structure is a configuration used wherein a plurality of modules moves over steps, through holes or squeezes through narrow passages.

Beginning at step S1800, each module initially begins in a sleep mode. While in a sleep mode, the module is neither moving nor emitting a scent.

In step S1820, a determination is made whether the module in the seed mode. The module is in the seed mode by either being randomly chosen to be in the seed mode or received a seed assignment from another module. If the module is not in the seed mode, the control proceeds to step S1825. Otherwise, the control proceeds to step S1840 if the module is not in the seed mode.

In step S1825, a determination is made whether a scent has been detected. If a scent has not been detected, the control proceeds to step S1890 where the process returns. If a scent has been detected, the control proceeds to step S1830, if a scent has been detected, where the module transitions to the search mode. In step S1835, the module propagates the scent from a module in the seed mode and moves along the gradient toward the scent. Thereafter, the control proceeds to S1890 where the process returns.

In step S1840, the module, in the seed mode, emits a scent to attract other modules. In step S1845, a determination is made whether a module appears in the direction of growth. If a module does not appear in the direction of growth, the control proceeds to step S1890 where the control returns. Otherwise, the control proceeds to step S1850 if a module appears in the direction of growth.

In step S1850, the module sends a seed assignment to the module in the direction of growth. In step S1855, the module then transitions to the final mode. In step S1860, when the module is in the final mode, the module propagates the scent received from the seed module.

In step S1870, a determination is made whether the structure is complete. The structure is complete when the modules have moved within a predetermined distance of each other. If the structure is not complete, the control returns to step S1860. Otherwise, the control proceeds to step S1890 if the structure is complete, where the control ends.

Figure 20:
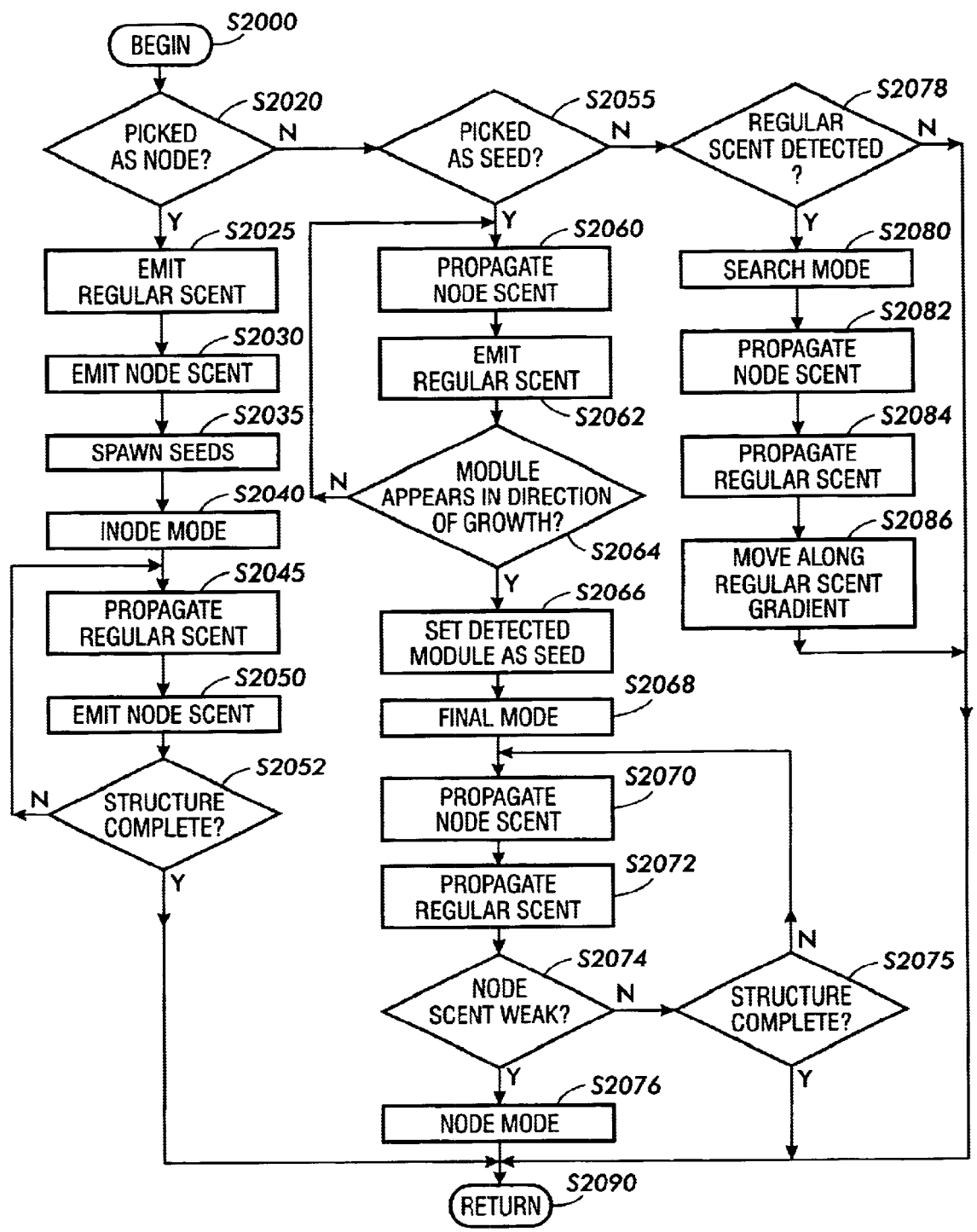
FIG. 20 is a flowchart outlining one exemplary operation of a module of FIG. 6 when a plurality of modules are used to create a branch structure according to this invention.
Figure 21:
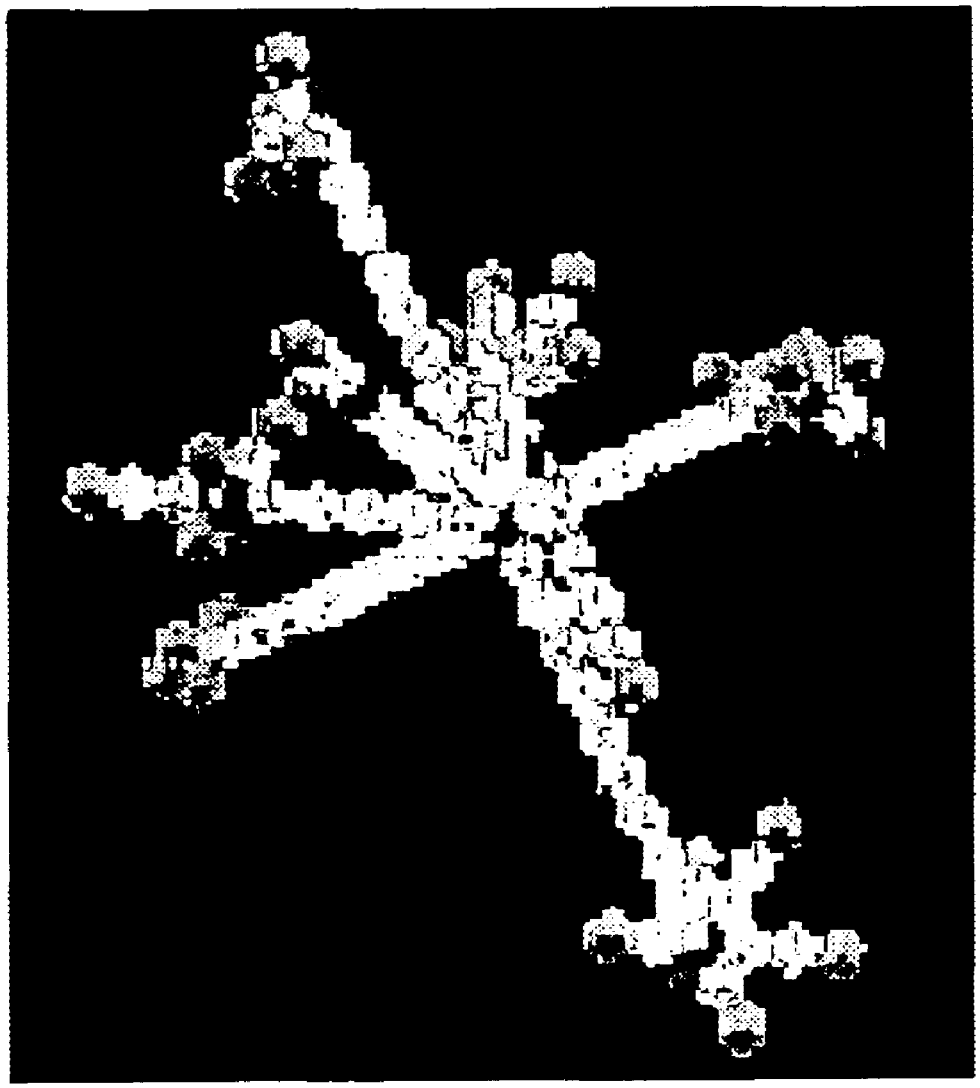
FIG. 21 illustrates the modules organized into a branched structure.

FIG. 20 is a flowchart outlining one exemplary embodiment of a method for creating recursive branching and FIG. 22 illustrates the modules during recursive branching. During recursive branching, the modules create several limbs. A hierarchical structure is thus created where each level has varying degrees of precision, arranging motion and strength. For example, when only one level of branching, instruction can be used as an artificial limb or artificial hand for locomotion. Adding extra levels of branching allows additional branches lower levels of strength and range of motion, with higher levels of precision.

Recursive branching uses a sleep mode, search mode, seed mode and final mode, similar to the chain structure, however an additional node mode and inode mode is used. While the node mode, the module emits a scent to attract other modules and randomly chooses which modules should be in the seed mode. While in the inode mode, the module remains inactive similar to the final mode.

However, unlike the chain structure, recursive branching uses two scents. The first scent is the regular scent which is used to grow the structure as in the chain structure. The second scent is a node scent. The node scent is used to indicate the location of the module in the node mode.

Beginning in step 2000, each module initially begins in the sleep mode. In step S2020, a determination is made whether the module is in the node mode. If the module is in the node mode, the control proceeds to step S2025. Otherwise, the control proceeds to step S2055 if the module is not in the node mode.

In step S2025, the module emits the regular scent to attract other modules. In step S2030 the module emits a node scent to indicate the position of the module. In step S2035, the module then spawns seeds by emitting a predetermined number of seed assignments based on the desired number of seeds.

In step S2040, the module then transitions to the inode mode. In step S2045, the module propagates the regular scent from a module in the seed mode or nod mode to attract other modules. In step S2050, the module then emits a node scent to indicate a position of the module.

In step S2052, a determination is made whether the structure is complete. The structure is complete when all of the modules have been used to create branches. If the structure is not complete, the control returns to step S2045. Otherwise, the control proceeds to step S2090 where the control returns.

In step S2055, a determination is made whether the module is in the seed mode. If a module is in the seed mode, the control proceeds to step S2060. Otherwise the control proceeds to step S2078 if the module is not in the seed mode.

In step S2060, the module propagates the node scent. In step S2062, the seed module emits a regular scent to attract other modules.

In step S2064, a determination is made whether a module appears in the in the direction of growth. If the module appears in the direction of growth, the control proceeds to step S2066. Otherwise, the control process returns to step S2060 if a module does not appear in the direction of growth.

In step S2066, the module sends a seed assignment to the dected module to transition to the seed mode. In step S2068, the module then transitions to the final mode.

In step S2070, the module propagates the node sent. In step S2072, the module then propagates the regular scent from a module in the seed mode.

In step S2074, a determination is made whether the received node scent is weak. If the node scent is weak, the control proceeds to step S2076 where the module transitions to the node. The module transitions to the node mode if the node mode is weak because a sufficient amount of space exists to create an additional branch without interfering with the other branches. The control then proceeds to step S2090 where the process returns.

Otherwise, the control proceeds to step S2075 where module determines if the structure is complete, the control process module determines if the structure is complete. If the structure is complete, the control returns to step S2070. Otherwise, the control process returns to step S2090 where the process returns if the structure is complete.

In step S2078, a determination is made whether the regular scent has been detected. If the regular scent has not been detected, the control proceeds to step S2090 where the process returns. Otherwise, the control process proceeds to step S2080 if a scent has been detected.

In step S2080, the module transitions to the search mode. In S2082, the module propagates the node scent. In step S2084, the control module then propagates the regular scent. In step S2086, the module moves along the regular scent gradient. Thereafter, the control proceeds to step S2090 where the process returns.

FIG. 22 is a flowchart outlining an exemplary embodiment of a method for creating a sponge structure and FIG. 23 illustrates a sponge structure. In creating a sponge-like structure, the module is provided to support delicate surfaces while reducing the risk of breaking the surface on contact.

As should be appreciated, the flowchart shown if FIG. 22 is similar to FIG. 18 except for step S2045. Thus a description of the steps are omitted except for step S2045. In step S2045, the module remains in the seed mode until it determines that two neighboring modules, instead of one, are in the desired direction of growth. Thereafter, like FIG. 18, the module sends a seed assignment to the two neighboring modules S2050.

Figure 24:
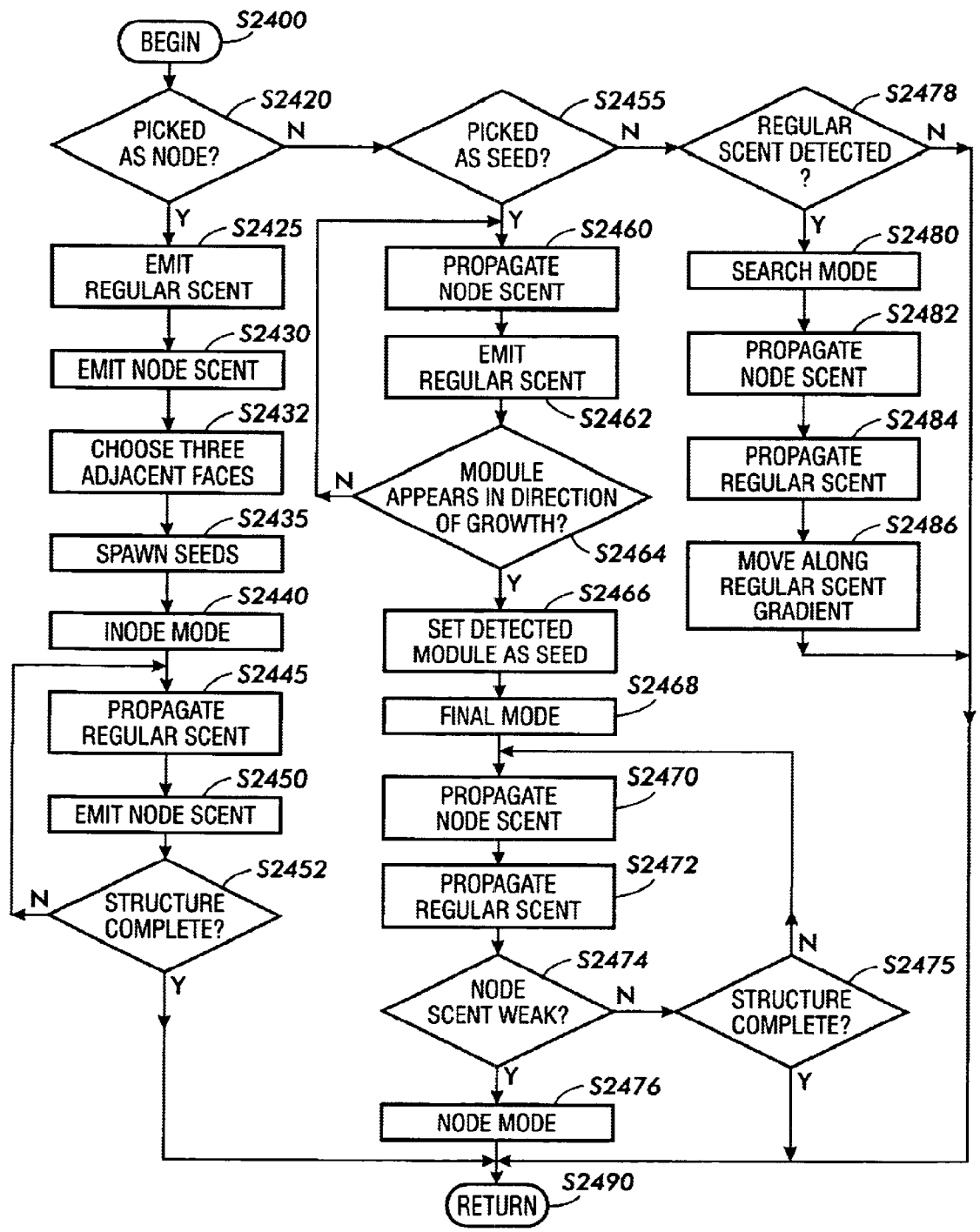
FIG. 24 is a flowchart outlining one exemplary operation of a module of FIG. 6 when a plurality of modules are used to create a regular lattice structure according to this invention.
Figure 25:
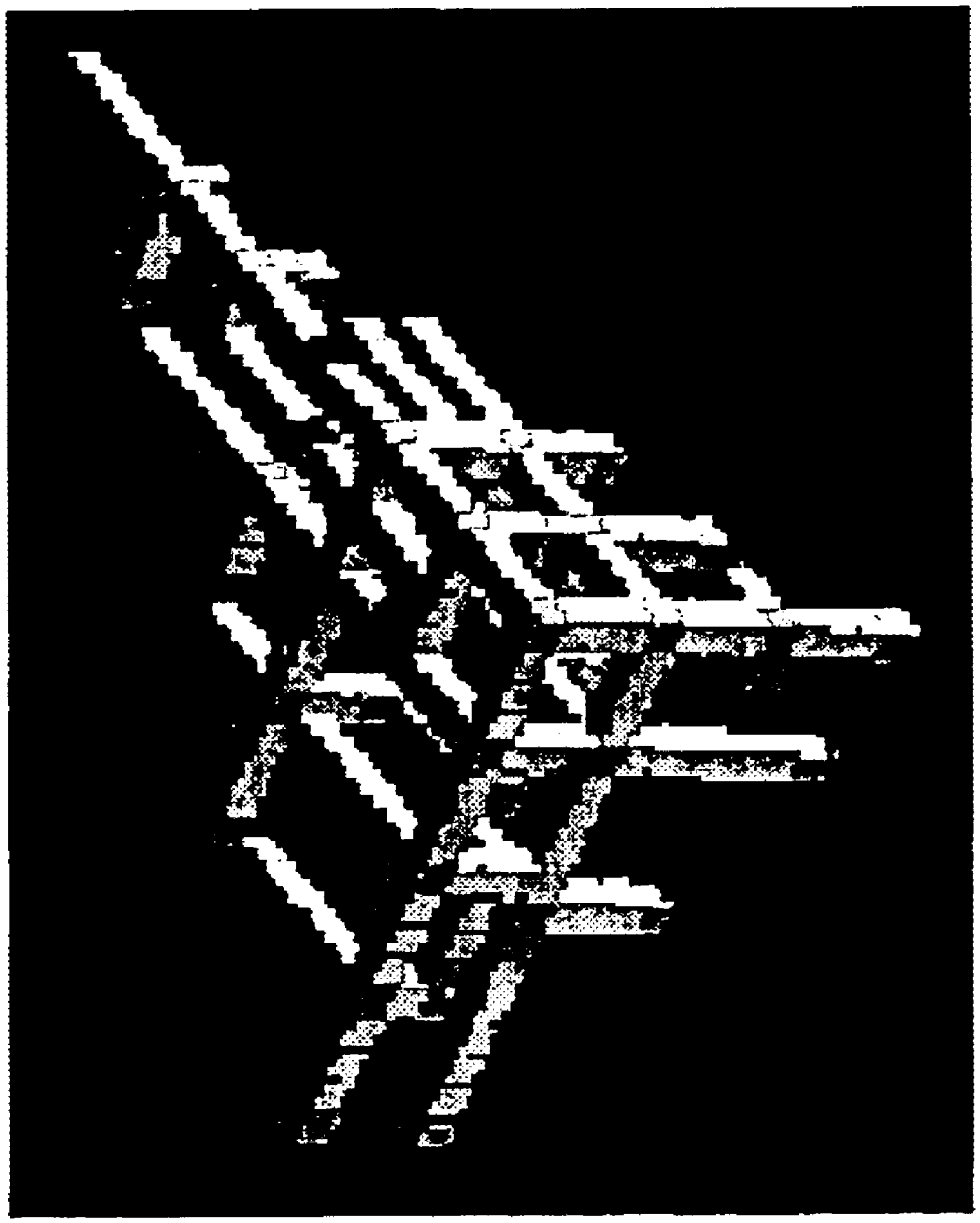
FIG. 25 illustrates modules organized into a lattice structure.

FIG. 24 is a flowchart outlining one exemplary embodiment of a method for creating a regular lattice and FIG. 25 illustrates the regular lattice. When the modules create a regular lattice, the modules grow in three directions to create a support structure rather than the random branching described in FIG. 20 for the recursive branching.

As should be appreciated, the flowchart of FIG. 24 is similar to the flowchart of FIG. 20, except that an additional step S2432 is used. Thus, a description of the steps are omitted except for step S2432. In step S2432, three adjacent module faces are selected. The three adjacent module faces are selected such that three mutually perpendicular axis, whose centers are directed to a desired direction of growth, are created. Thereafter, the module in the node mode send and assignment impulse to modules located along the three faces.

Figure 26:
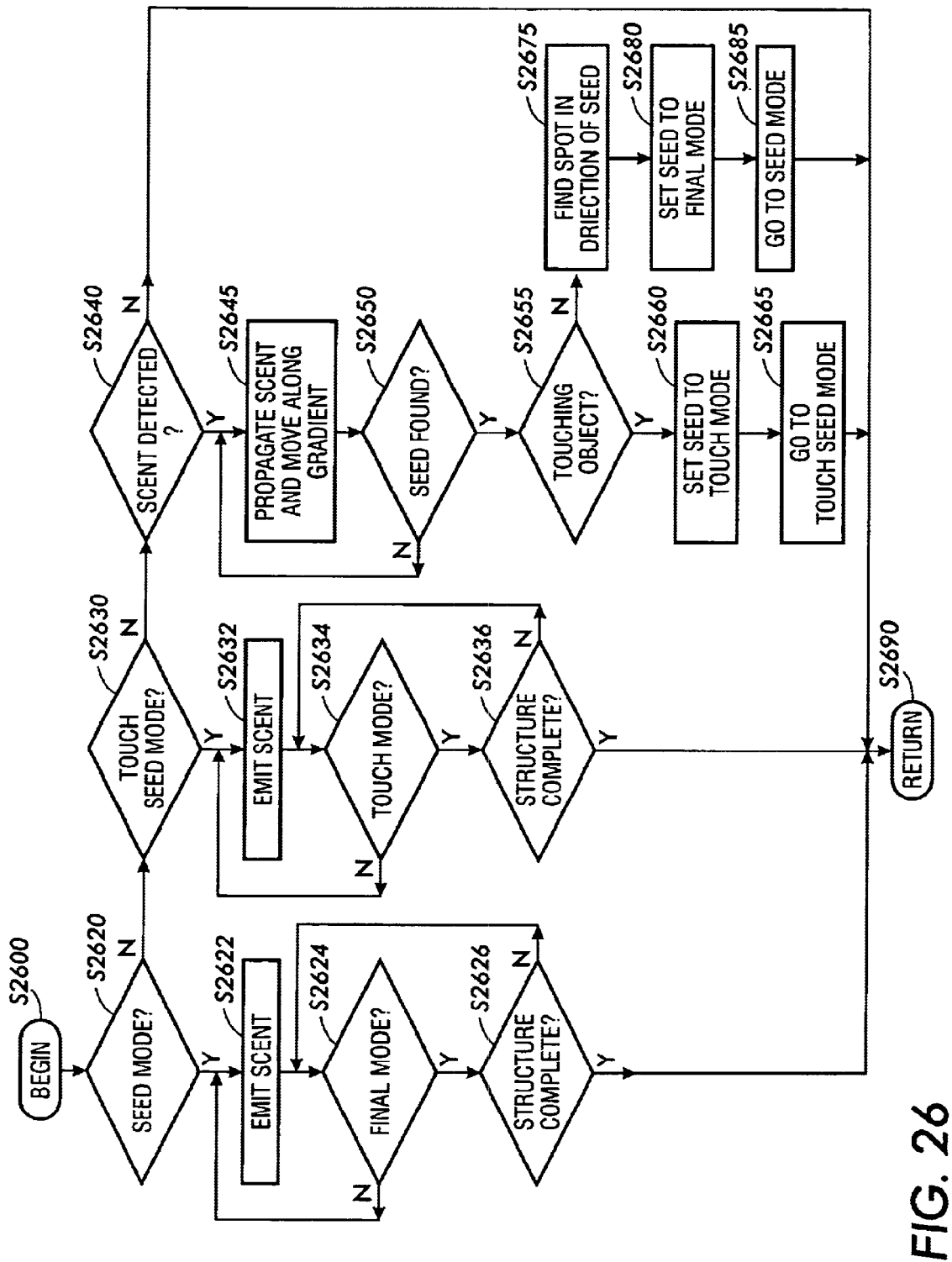
FIG. 26 is a flowchart outlining one exemplary operation of a module of FIG. 6 when a plurality of modules are used to grasp an object according to this invention.
Figure 27:
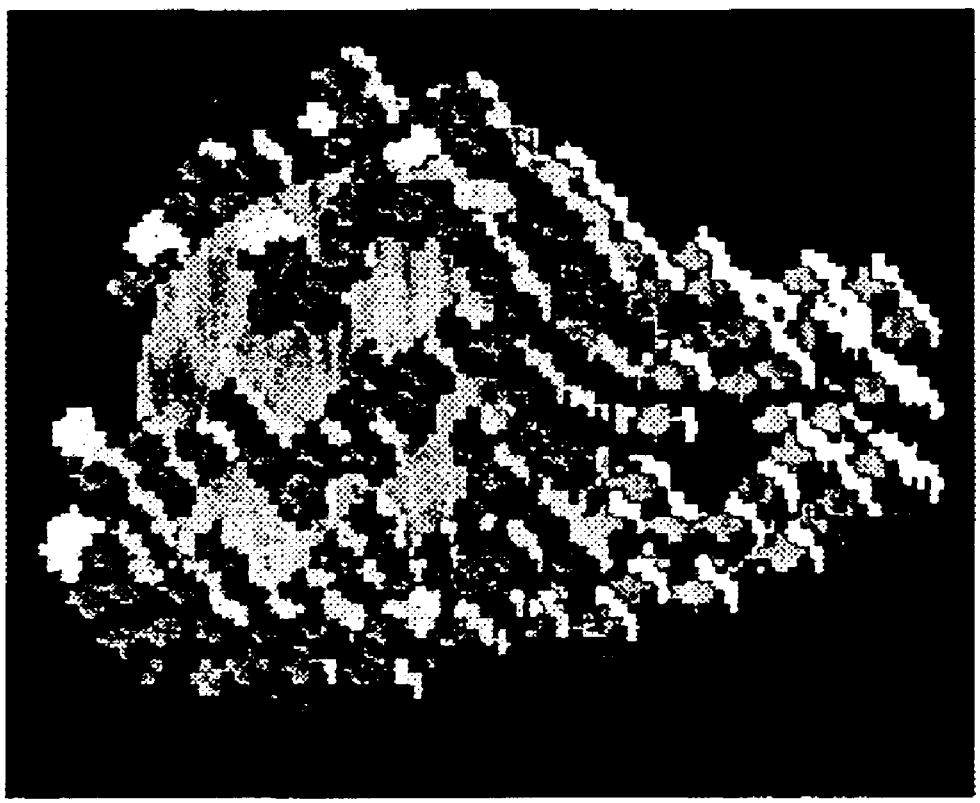
FIG. 27 illustrates the modules grasping an object.

FIG. 26 is a flowchart outlining one exemplary embodiment of a method for grasping an object and FIG. 27 illustrates the modules grasping an object. The process used is similar to the chain of FIG. 18, however, there are two seed modes. The first seed mode is the regular seed mode and the second seed mode is a touchseed mode. While in the regular seed mode, the module emits a scent to direct other modules 1710 to grow in the direction of the object (i.e. move in the direction of the scent). While in the touchseed mode, the module emits a scent to other modules 1710 to grow in the direction around the object so that the other modules 1710 can grasp the object.

Beginning at step S2600, the process begins with each module initially in the sleep mode. In step S2620, a determination is made whether the module is in the seed mode. If the module is in the seed mode, the control proceeds to step S2622. Otherwise, the control process proceeds to step S2630 if the module is not in the seed mode.

In step S2622, the module emits a scent to attract other modules. In step S2624, a determination is made whether the module is in a final mode. If the module is not in a final mode, the control returns to step S2622. While in the final mode, the module propagates the received scent from a module in either the seed or touchseed mode. Otherwise, the control process proceeds to step S2626 if the module is not in the final mode.

In step S2626, a determination is made whether the structure is complete. The structure is complete when the plurality of modules are adequately grasping the object. If the structure is complete, control proceeds to step S2690 where the process returns. Otherwise, the control returns to step S2624 if the structure is not complete.

In step S2630, a determination is made whether the module is in the touch mode. If the module is in a touch mode, the control proceeds to step S2632. While in the touch mode, the module propagates the scent received from a module in the seed mode or touch mode. Otherwise, the control proceeds to step S2640 if the module is not in the touch mode.

In step S2632, the module emits a scent to attract other modules. In step S2634, a determination is made whether the module is in the touch mode. If the module is not in a touch mode, the control returns to step S2632. Otherwise, the control process proceeds to step S2636 if the module is in the touch mode.

In step S2636, a determination is made whether the structure is complete. If the structure is complete, the control proceeds to step S2690 where the control returns. Otherwise, the control returns step S2634 if the structure is not complete.

In step S2640, a determination is made whether a scent has been detected. If a scent has not been detected, the control proceeds to step S2690 where the process returns. Otherwise, the module transitions to the search mode and the control proceeds to step S2645 if a scent has been detected.

In step S2645, the module propagates the received scent and moves along the gradient. In step S2650, a determination is made whether a module in the seed mode has been found. If a module in the seed mode has not been found, the control returns to step S2645. Otherwise, the control process proceeds to step S2655 if a module in the seed mode has been found in step S2655, a determination is made whether the detected module in the seed mode is touching an object. If the detected module is touching the object, the control proceeds to step S2660. Otherwise, the control proceeds to step S2675 if the detected module is not touching the object.

In step S2660, module sends a touchseed assignment to the detected module. In step S2665, the module then transitions to the touchseed mode. Thereafter, control proceeds to step S2690 where the control returns.

In step S2685, the module finds a spot in the direction of the seed. In step S2680, the module then send a final assignment to the detected seed. In step S2685, the module then transitions to the seed mode. Thereafter, the control proceeds to step S2690 where the control returns.

Figure 28:
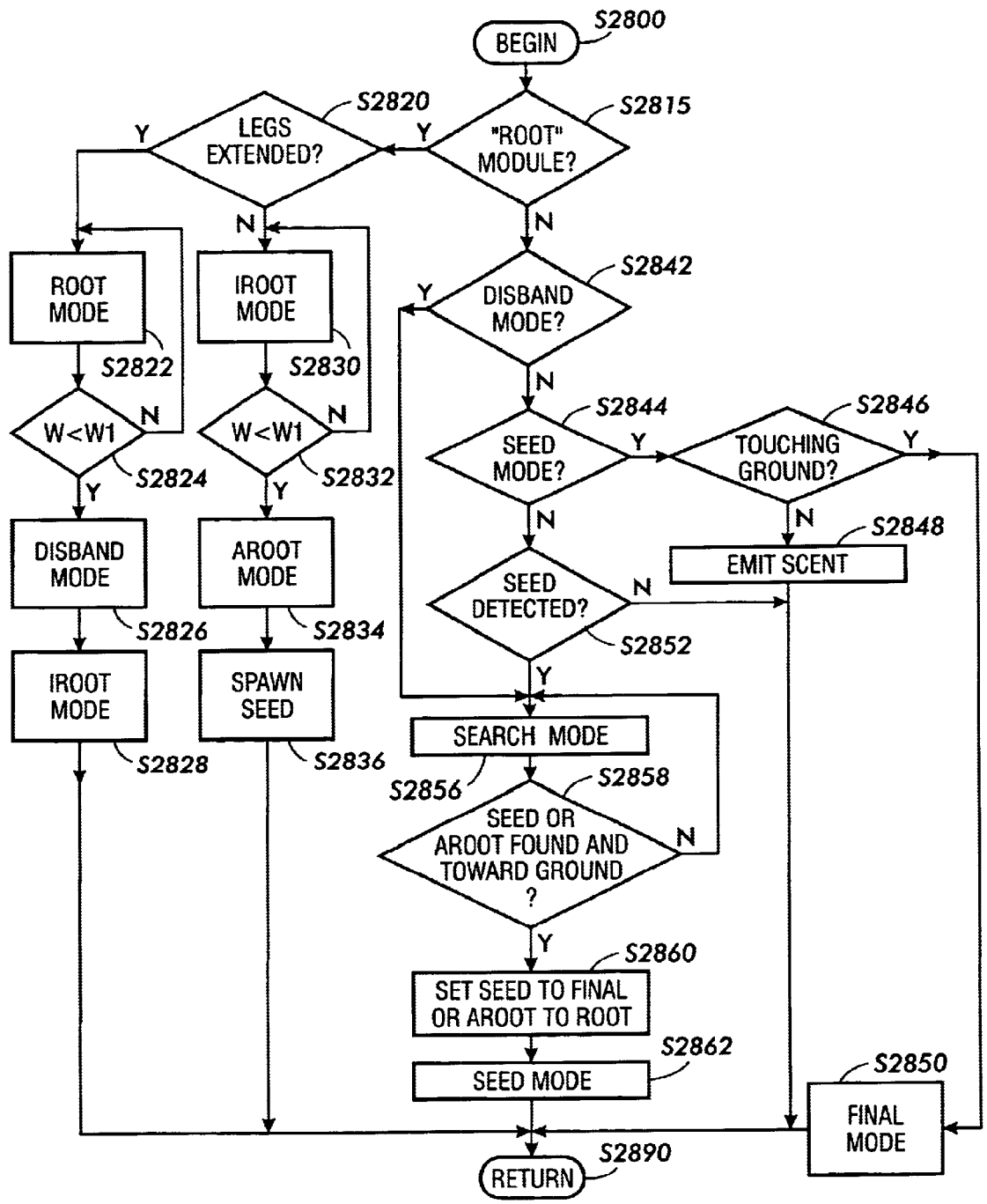
FIG. 28 is a flowchart outlining one exemplary operation of a module of FIG. 6 when a plurality of modules are used as a support structure according to this invention.
Figure 29:
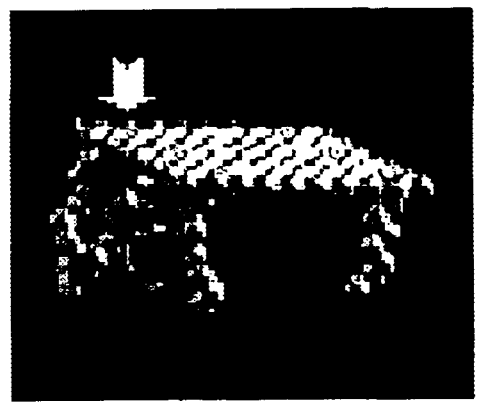
FIGS. 29–34 illustrate the modules organized as a support structure.
Figure 30:
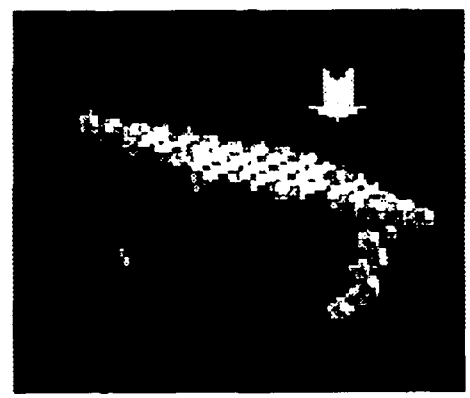
Figure 31:
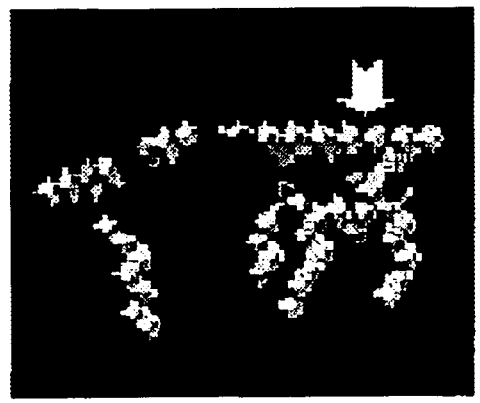
Figure 32:
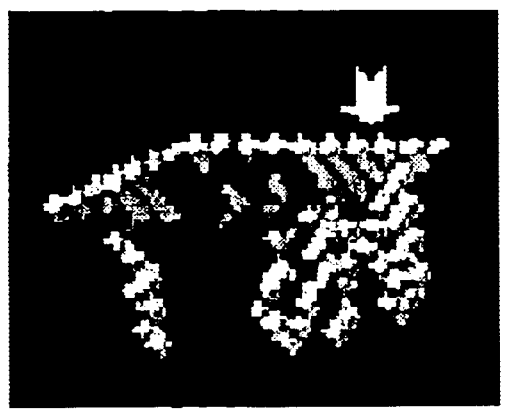
Figure 33:
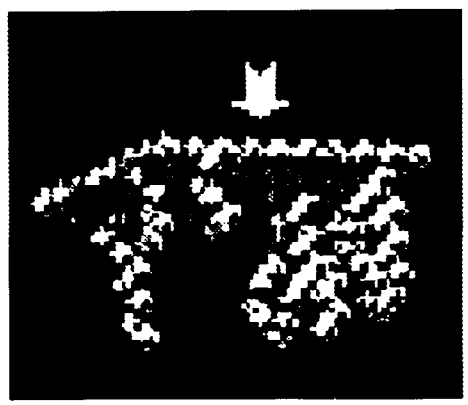
Figure 34:
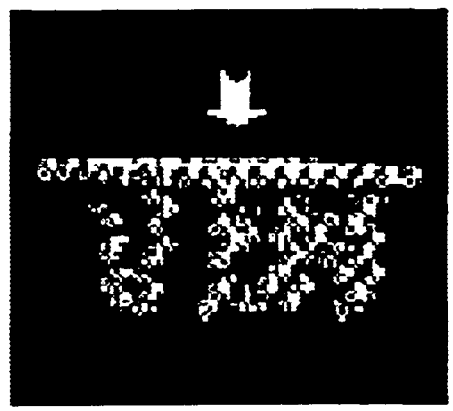

FIG. 28 is a flowchart outlining one exemplary embodiment of a method for creating a support structure and FIGS. 29–34 illustrate the modules as a support structure in which force has been applied to the structure. When an excessive amount of force is placed on one of the modules, the modules are rearranged to create additional support, legs, extending toward the ground, to support the force. As should be appreciated, each module is equipped with a force sensor to indicate the amount of force placed on each of the modules.

Beginning in step S200, the control process proceeds to step S2815. In step S2815, a determination is made whether the module is a root module. If the module is a root module, the module can give seed assignments to other modules to grow a leg when needed to provide additional support for the structure. A predetermined number of modules are initially selected to be root modules such that a sufficient amount of space is created between the legs of the table. If a module is a root module, the control proceeds to step S2820. Otherwise, the process proceeds to step S2842 if the module is not a root module.

In step S2820, a determination is made whether the leg is been extended. The leg has been extended if a module is detected relative to the ground. If a leg has been detected, the control proceeds to step S2822. Otherwise, the control proceeds to step S2830.

In step S2822, the module transitions to the root mode. In step S2824, a determination is made whether the weight applied to the module is less than a first predetermined weight. If the force applied is less than the first predetermined force, then it is unnecessary to maintain the legs. Thus, the leg is removed. If the force applied is less than the first predetermined force, the control returns to step S2822. Otherwise, the control proceeds to step S2826. If the force applied is more than the predetermined force.

In step S2826, the module emits a disband assignment to modules located relative to the ground. In step S2828, the module transitions to the iroot mode. Thereafter, the control proceeds to step S2690 where the process returns.

In step S2830, the module transitions to the iroot mode if not already in the iroot mode. In step S2832, a determination is made whether the force applied is greater than a second predetermined weight. If the force applied is greater than the second predetermined weight, then it is necessary to create a leg to reduce the force applied to the other legs. If the force applied is less than the second predetermined weight, the control returns to step S2830. Otherwise, the control proceeds to step S2834.

In step S2834, the module transmissions to the aroot mode. In step S2836, the module emits a seed assignment to spawn seeds in a direction relative to the ground to create an additional leg. Thereafter, the control proceeds to step S2890 where the process ends.

In step S2842, a determination is made whether the module has received a disband assignment. If the module has received a disband assignment, the module proceeds to step S2856. Otherwise, the control proceeds to step S2844 if the module has not received a disband assignment.

In step S2844, a determination is made whether the module has received a seed assignment. If the module has received a seed assignment, control proceeds to step S2846. Otherwise, the control proceeds to step S2852 if the module has not received a seed assignment.

In step S2846, a determination is made whether the module is touching the ground. If the module is touching the ground, the control proceeds to step S2850 where the module transitions to the final mode. Otherwise the control proceeds to step S2848 if the module is not touching the ground. Thereafter the control proceeds to step S2890 where the control returns.

In step S2852, a determination is made whether the module had received a search assignment. If the module has not received a search assignment, the control proceeds to step S2890 and the control returns. Otherwise, the control proceeds to step S2856 if a search assignment has not been detected.

In step S2856, the module transmissions to the search mode where the module moves along the gradient of the emitted scent. In step S2858, the control determines if a module in either a seed mode or an aroot mode has been found and if the module is toward the ground. If a module in either the seed mode or a root mode has been found and is toward the ground, the control proceeds to step S2860. Otherwise, the control returns to step S2856.

In step S2860, the module sends either a final assignment or a root assignment based on the detected module. In step S2862, the module then transitions to the seed mode. Thereafter, the control returns in step S2690.

While this invention has been described in conjunction with the exemplary embodiments described above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of operating a robot comprised of a plurality of modules, each module made of a cubic shape with six faces, each face including an arm for expansion and contraction with another module, comprising the steps of:

randomly choosing a first module to emit a first scent along an axis of configuration and a second scent in a direction perpendicular to the axis;

maintaining a position of modules along the axis upon receipt of the first scent, wherein the modules along the axis propagate the second scent in the direction perpendicular to the axis; and moving modules receiving the second scent toward the axis, wherein the movement of the modules receiving the second scent is controlled by the second scent, wherein the first scent and the second scent remain until all of the modules are within a predetermined distance from each other.

2. The method of claim 1, wherein the modules receiving the first scent maintain an optimal density.

3. The method of claim 2, wherein the modules receiving the first scent pass suggested moves to maintain the optimal density.

4. The method of claim 1, wherein the modules receiving the second scent maintain an optimal density.

5. The method of claim 1, wherein the first module is located within a close proximity with the plurality of modules.

6. The method of claim 1, wherein the first module is located along a desired direction for reconfiguration.

7. A method of operating a robot comprised of a plurality of modules when a module receives a force along an axis above a predetermined value, each module made of a cubic shape with six faces, each face including an arm for expansion and contraction with another module, comprising the steps of:

sending a first scent along the axis, a second scent in a perpendicular direction from the axis, and forming a rigid support by the module receiving the force;

transitioning to a rigid support upon receipt of the first scent and propagating the second scent in the direction perpendicular to the axis by modules in receipt of the first scent; and expanding toward the second scent by modules receiving the second scent, wherein the first scent and second scent remain until the force received is below the predetermined value.

8. A method of operating a robot comprised of a plurality of modules while manipulating an object within the plurality of modules, each module made of a cubic shape with six faces, each face including an arm for expansion and contraction with another module, comprising the steps of:

moving modules in the direction of movement into the object; and moving modules not in the direction of movement away from the object, wherein the modules are moved into the object and away from the object until the object is at a final location.

9. The method of claim 8, wherein if one of the faces of the module is not in contact with another module or a surface, the module does not move.

10. The method of claim 8, wherein modules in the direction of movement which are not touching the object are moved toward the object.

11. The method of claim 8, wherein the object is moved by the modules through the use of a translational motion.

12. The method of claim 8, wherein the object is moved by the modules through the use of a rotational motion.

* * * * *